(12) United States Patent
Ovadia

(10) Patent No.: US 7,747,862 B2
(45) Date of Patent: Jun. 29, 2010

(54) METHOD AND APPARATUS TO AUTHENTICATE BASE AND SUBSCRIBER STATIONS AND SECURE SESSIONS FOR BROADBAND WIRELESS NETWORKS

(75) Inventor: Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1030 days.

(21) Appl. No.: 10/878,713

(22) Filed: Jun. 28, 2004

(65) Prior Publication Data

US 2005/0289347 A1 Dec. 29, 2005

(51) Int. Cl.
 *H04L 9/32* (2006.01)
(52) U.S. Cl. ..................................... 713/176
(58) Field of Classification Search .................. 713/176
 See application file for complete search history.

(56) References Cited

U.S. PATENT DOCUMENTS

| | | | | |
|---|---|---|---|---|
| 6,826,690 | B1 * | 11/2004 | Hind et al. ................... | 713/186 |
| 6,886,095 | B1 * | 4/2005 | Hind et al. ................... | 713/168 |
| 6,980,660 | B1 * | 12/2005 | Hind et al. ................... | 380/282 |
| 6,988,250 | B1 * | 1/2006 | Proudler et al. ................ | 716/1 |
| 7,171,555 | B1 * | 1/2007 | Salowey et al. ............. | 713/156 |
| 7,400,576 | B2 * | 7/2008 | Mori et al. ................... | 370/229 |
| 2002/0169717 | A1 * | 11/2002 | Challener ..................... | 705/40 |
| 2003/0120767 | A1 * | 6/2003 | Morimoto ..................... | 709/223 |

OTHER PUBLICATIONS

IEEE Std 802.16-2001, IEEE Computer Society, Apr. 8, 2002, IEEE, 1, 2 and 54-56.*

Trusted Computing Platform Alliance (TCPA) Main Specification Version 1.1b; Feb. 22, 2002; Trusted Compting Group.*
Sundeep Bajikar, Trusted Platform Module (TPM) based Security on Notebook PCs—White Paper, Mobile Platforms Group, Intel Corporation, Jun. 20, 2002.*
Boris Balacheff, Liqun Chen, Siani Pearson, David Plaquin, Graeme Proudler, Trusted Computing Platforms: TCPA Technology in Context, Prentice Hall, Jul. 22, 2002, Chapters 1, 7 and 12.*

* cited by examiner

Primary Examiner—Michael J Simitoski
Assistant Examiner—James Turchen
(74) Attorney, Agent, or Firm—Blakely, Sokoloff, Taylor & Zafman LLP

(57) ABSTRACT

Methods and apparatus to authenticate base and subscriber stations and secure sessions for broadband wireless networks, such as IEEE P802.16-based networks. The apparatus employs a trusted platform module (TPM) to generate security keys, including attestation identity keys (AIKs). A subscriber station (SS) generates an AIK key pair for a specific authentication server (AS) operated by a broadband wireless network, and sends the public AIK key to the AS during a one-time service signup process. In response to an access request, the SS sends authentication information including a manifest signed with the SS's private AIK key. The SS may then be authenticated by the AS via use of the SS's public AIK key. The AS may be authenticated by the SS using a similar process, thus supporting mutual authentication via AIK keys. The TPM may also be used to verify a current configuration of a subscriber station platform is an authorized configuration. Integrity measurements are made via the TPM, and corresponding configuration identifiers are sealed to the TPM and sent to the authentication server during the signup process. During a subsequent access request, an attempt is made to unseal a configuration identifier, which can only proceed if a corresponding configuration has not changed.

30 Claims, 14 Drawing Sheets

METHOD AND APPARATUS TO AUTHENTICATE BASE AND SUBSCRIBER STATIONS AND SECURE SESSIONS FOR BROADBAND WIRELESS NETWORKS

FIELD OF THE INVENTION

The field of invention relates generally to security schemes for wireless networks, and, more specifically but not exclusively relates to techniques for enhancing security for broadband wireless networks.

BACKGROUND INFORMATION

Broadband wireless networks based on the IEEE (Institute of Electrical and Electronic Engineers) 802.16 suite of standards (current version—IEEE P802.16-REVd/D5-2004, also referred to herein as the 802.16 standard for convenience) are emerging as a viable alternative to DSL (digital subscription line) and cable modems for high-speed broadband access for homes and businesses. The original IEEE 802.16-2001 specification defined the WirelessMAN™ air interface specification for wireless metropolitan area networks (MANs). The completion of this standard heralds the entry of broadband wireless access as a major new tool in the effort to link homes and businesses to core telecommunications worldwide.

FIG. 1 shows a simplified broadband wireless network with point-to-multipoint (PMP) architecture for both licensed and licensed-exempt frequency bands typically below 11 GHz. Other types of architectures (not shown) such as mesh broadband wireless networks are permissible. A backbone IP network 100 is connected to a broadband wireless network using radio access nodes (RANs) 102A and 102B. Each RAN is connected via a wired link such as an optical fiber (depicted as optical fiber links 103A, 103B and 103C) or point-to-point wireless link (please modify FIG. 1 accordingly) to one or more radio cells (depicted between RAN 102A or 102B to radio cells 104A, 104B, and 104C). At the hub of a radio cell is a respective Base station (BS) 106A, 106B, and 106C. A Base Station system includes an advanced antenna system (AAS), which is typically located on top of a radio tower, is used to transmit high-speed data to multiple subscriber stations (SSs) 108 and receive data from the SSs via unidirectional wireless links 110 (each SS uplink transmission is independent on the others). More particularly, each SS 108 can access network 100 (via an appropriate BS) using the PHY+MAC (Physical+Media Access Control) layer features defined by the IEEE P802.16-REVd/D5-2004 air-interface standard. A fixed SS typically uses directional antenna while mobile or portable SS usually uses an omni-directional antenna.

Transmission of data bursts from network 100 to an SS 108 proceeds in the following manner. The data bursts such as IP packets or Ethernet frames are encapsulated in IEEE P802.16-REVd/D5-2004 data frame format and forwarded from an appropriate RAN to an appropriate BS. The BS then transmits non-line of sight (NLOS) data to each SS 108 using a unidirectional wireless link 110, which is referred to as a "downlink." Transmission of data from an SS 108 to network 100 proceeds in the reverse direction. In this case, the encapsulated data is transmitted from an SS to an appropriate BS using a unidirectional wireless link referred to as an "uplink." The data packets are then forwarded to an appropriate RAN, converted to IP Packets or Ethernet frames, and transmitted henceforth to a destination node in network 100. Data bursts can be transmitted using either Frequency-Division-Duplexing (FDD) or Time-Division-Duplexing (TDD) schemes. In the TDD scheme, both the uplink and downlink share the same RF channel, but do not transmit simultaneously, and in the FDD scheme, the uplink and downlink operate on different RF channels, sometimes simultaneously.

Multiple BSs are configured to form a cellular-like wireless network. A network that utilizes a shared medium requires a mechanism to efficiently share it. Within each cell, the wireless network architecture is a two-way PMP, which is a good example of a shared medium; here the medium is the space (air) through which the radio waves propagate. The downlink, from the base station (BS) to an SS, operates on a PMP basis. Provisions within the IEEE P802.16-REVd/D5-2004 standard include a central BS with AAS within each cell. Such an AAS includes a sectorized antenna that is capable of handling multiple independent sectors simultaneously. Within a given frequency channel and antenna sector, all stations receive the same transmission, or parts thereof.

In the other direction, the subscriber stations share the uplink to the BS on a demand basis. Depending on the class of service utilized, the SS may be issued continuing rights to transmit, or the right to transmit may be granted by the BS after receipt of a request from an SS. In addition to individually-addressed messages, messages may also be sent on multicast connections (control messages and video distribution are examples of multicast applications) as well as broadcast to all stations. Within each sector, users adhere to a transmission protocol that controls contention between users and enables the service to be tailored to the delay and bandwidth requirements of each user application.

Another important consideration for a shared medium is security. Since the medium is air, transmissions can be easily intercepted or copied. To counter this, the 802.16 standard specifies data transmissions using a link cipher to provide for encryption and, optionally, authentication and integrity checking of user data packets. There are two defined link ciphers; DES-CBC (Data Encryption Standard (DES) algorithm in the Cipher Block Chaining (CBC) mode and AES-CCM Advanced Encryption Standard (AES) in the Counter with CBC-MAC (CMM) mode. To provide keying material for the link cipher and to authorize subscriber stations that attempt to enter the network, a PKM (Privacy and Key Management) protocol is specified that provides a certificated authorization mechanism for SS's and a key exchange scheme to enable a base station to transfer keys to the SS.

Security flaws have been identified in the DES-CBC link cipher and in the PKM protocol. The problems with PKM were somewhat mitigated by the original nature of the IEEE P802.16-2001 transport mechanism, which uses highly directional, fixed, point-to-point and point-to-multipoint, high frequency transceivers. This presents a significant technical and physical barrier to attackers attempting to subvert the security of the wireless link. However as the newer IEEE P802.16-REVd/D5-2004 wireless links becomes deployed using lower frequency bands, omni-directional antennas, and mobile equipment, the barriers to attackers are lowered, and PKM becomes a protocol that is feasible to attack for the purposes of theft of service, information gathering and impersonation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5a is a schematic diagram illustrating operations in accordance with the flowchart of FIG. 4a;

DETAILED DESCRIPTION

Embodiments of methods and apparatus authenticate participants and secure sessions for broadband wireless networks are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments discussed below, a Trusted Computing Group (TCG) security scheme (promulgated by the Trusted Computing Group, a standards organization in Beaverton, Oreg.) is implemented to generate, store and retrieve security-related data in a manner that facilitates privacy and security in broadband wireless networks, including IEEE 802.16 defined networks. In the embodiments, a TCG token comprising a trusted platform module (TPM) is employed. Generally, TPM functionality may be embodied as a hardware device (most common) or via software. For example, integrated circuits have been recently introduced to support TPM functionality, such as National Semiconductor's LPC-based TCG-compliant security controller, or similar integrated circuits made by Atmel Corporation and Infineon Technologies AG, for example.

TCG is an industry consortium concerned with platform and network security. The TCG main specification (Version 1.2, October, 2003—hereinafter referred to as the "version 1.2 Specification") is a platform-independent industry specification that covers trust in computing platforms in general. The TCG main specification defines a trusted platform subsystem that employs cryptographic methods when establishing trust. The trusted platform may be embodied as a device or devices, or may be integrated into some existing platform component or components. The trusted platform enables an authentication agent to determine the state of a platform environment and seal data particular to that platform environment. Subsequently, authentication data (e.g., integrity metrics) stored in a TPM may be returned in response to an authentication challenge to authenticate the platform.

Figure 1:
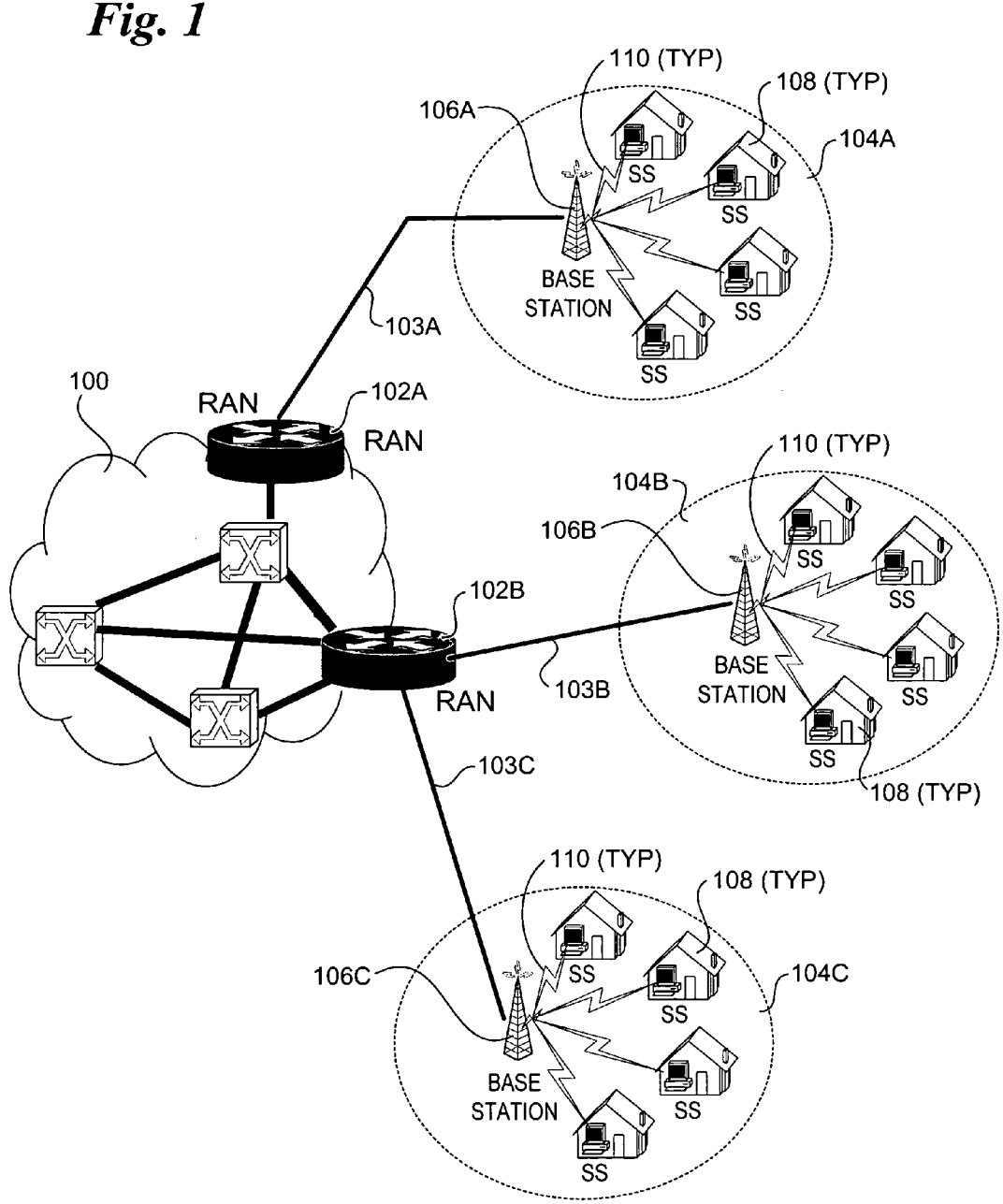
FIG. 1 is a schematic diagram of an exemplary broadband wireless network with point-to-multipoint topology based on the IEEE P802.16-REVd/D5-2004 standard.
Figure 2:
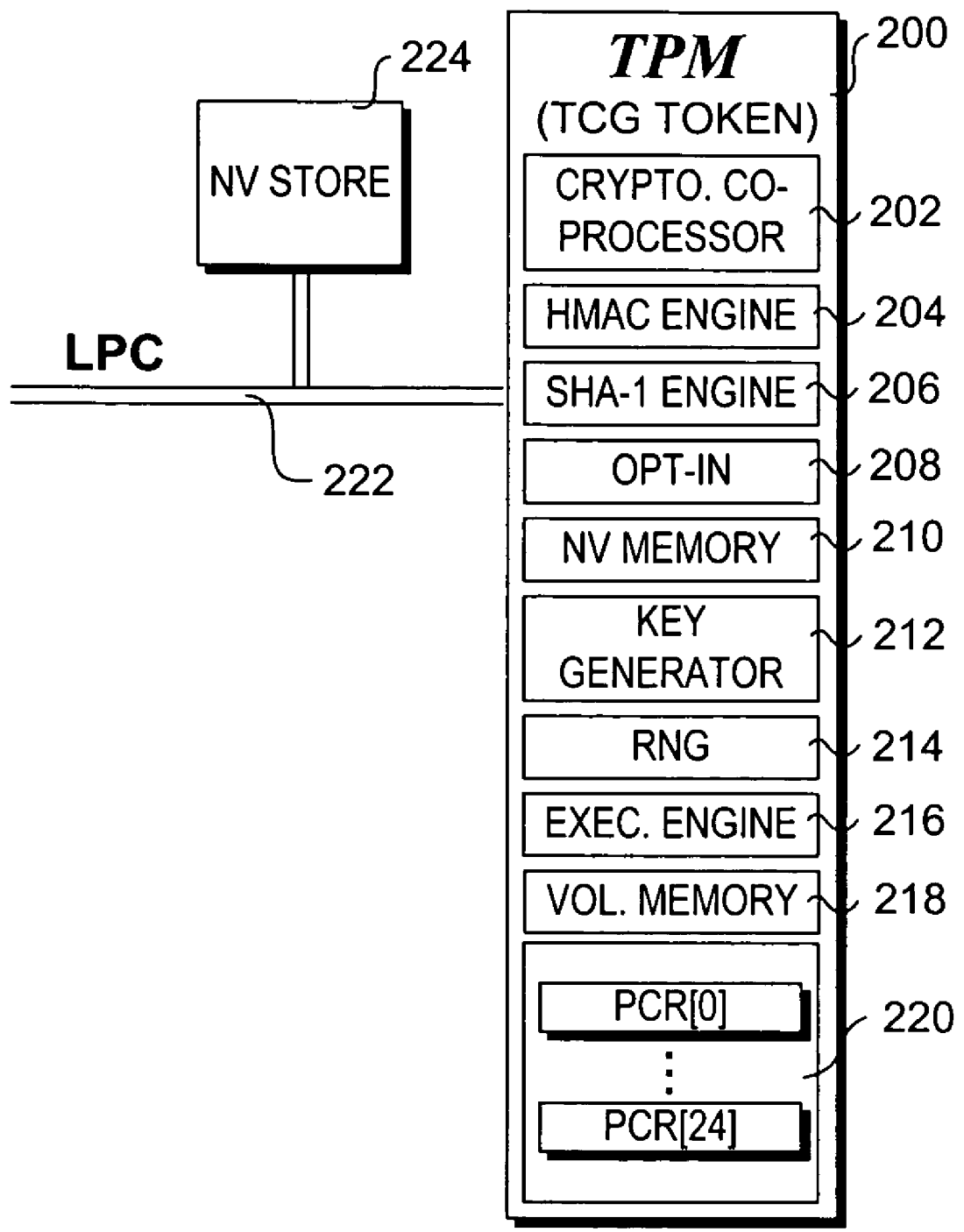
FIG. 2 is a schematic diagram of a trusted platform module (TPM)

Details of a Version 1.2-compliant TPM 200 and selected associated circuitry are shown in FIG. 2. TPM 200 provides several functions relating to security and privacy. These include a cryptographic co-processor 202, an HMAC (Hashing for Message Authentication code) engine 204, an SHA-1 (security hash algorithm-1) engine 206, an Opt-In component 1008, non-volatile (NV) memory 210, a key generator 212, a random number generator (RNG) 214, an execution engine 216, volatile memory 218, and Platform Configuration Registers (PCRs) 220. Also provided in one TPM embodiment but not shown are an input/output component and a power detection component. FIG. 2 also shows a low pin count (LPC) bus 222 and a non-volatile store 224. In one embodiment, LPC bus 1022 is configured per Intel LPC Interface Specification Revision 1.0, Sep. 29, 1997.

In general, security keys may be generated by key generator 212 or random number generator 214. HMAC engine 204 and SHA-1 engine 206 are used to perform hashing operations in accordance with the well-known HMAC and SHA-1 hashing algorithms. If desired, a TPM may perform encryption and decryption operations via cryptographic co-processor 202. More commonly, encryption and decryption operations will be performed by a dedicated cryptographic engine or cryptographic software running on a general-purpose processor.

The root of trust for reporting (RTR) is responsible for establishing platform identities, reporting platform configurations, protecting reported values, and establishing a context for attesting to reported values. The RTR employs a cryptographic identity in order to distinguish configuration reports and enable a challenger to authenticate the platform identity. The platform identity is an embodiment of all the roots of trust. A conventional identity ordinarily is a label that is unique within the context of an application domain. In contrast, a cryptographic identity is universally unique and non-guessable. To create such a cryptographic identity, it must be infeasible to guess an identity given a feedback loop for checking. Additionally, proof of possession of a cryptographic identity should be possible without disclosing it.

Platform uniqueness is achieved through an asymmetric key pair, known as the endorsement key (EK), which is embedded in the TPM. Use of the EK is restricted such that the only external representation of the platform is through aliases, known as attestation identities (and corresponding Attestation Identity Keys (AIKs). Prior to TPM use, a platform identity is created. The EK may be installed during platform manufacturing or generated by a vendor just before a customer takes delivery. TPM and platform manufacturers and their distributors determine the exact point in time when the EK is created. TPM and platform manufacturers are involved in EK creation because they vouch for the validity of the EK and TPM containing the EK.

An AIK is used as an alias for the EK, such that an EK is never revealed. AIKs are employed for signatures and not encryption. A TPM can create a virtually unlimited number of AIKs. Each AIK comprises an RSA 2048-bit asymmetric key pair. Per the Version 1.2 specification, AIKs are only permitted to sign data generated by a TPM. However, this is not limiting, but rather was chosen as part of an overall security policy.

A TPM uses "integrity metrics" to ascertain platform configuration. A "trusted measurement root" in the TPM measures certain platform characteristics, logs-in the measurement data, and stores the final result in a TPM (which contains the root of trust for storing and reporting integrity metrics). When an integrity challenge is received, the trusted platform agent gathers the following information: the final results from the TPM, the log of the measurement data from the trusted platform measurement store, and TCG validation data that states the values that the measurements should produce in a platform configured in accordance with the configuration that existed at the time the integrity measurements were sealed. The operations of making an identity and enabling key-pair generation enables TPM functionality to be employed for authentication purposes to support secure network data transfers.

In respective embodiments, security measures facilitated by TPM functions are employed for authenticating a service subscriber client and performing mutual authentication of the SS client and a base station operator. Operations corresponding to client and mutual authentication processes according to various embodiments are generally shown in the flowcharts of FIGS. 3a, 3b, 4a, and 4b.

In some embodiments, a multi-stage scheme is employed, which begins with an initial signup stage. It is noted that in most instances, a fixed subscriber station, such as a device operated by a home or business users, will access a network backbone via the same base station, or at the least, through the same service provider. For the subscriber station's viewpoint, a typical access service may be part of a paid access service (similar to that offered by an Internet service provider, for example), or may be offered via the subscriber's employer. For example, the base station could be operated by an enterprise, while a subscriber station represents a workstation in one of the enterprise's offices that does not include a wired broadband connection.

One purpose of the signup stage is to exchange initial security information that will be subsequently used during a post-signup access stage described below. By exchanging this information during a one-time signup stage, subsequent access sessions may be initiated faster. Furthermore, the exchange of some of the security information only occurs once, reducing the chance that this information might be compromised by an outside agent.

Figure 3A:
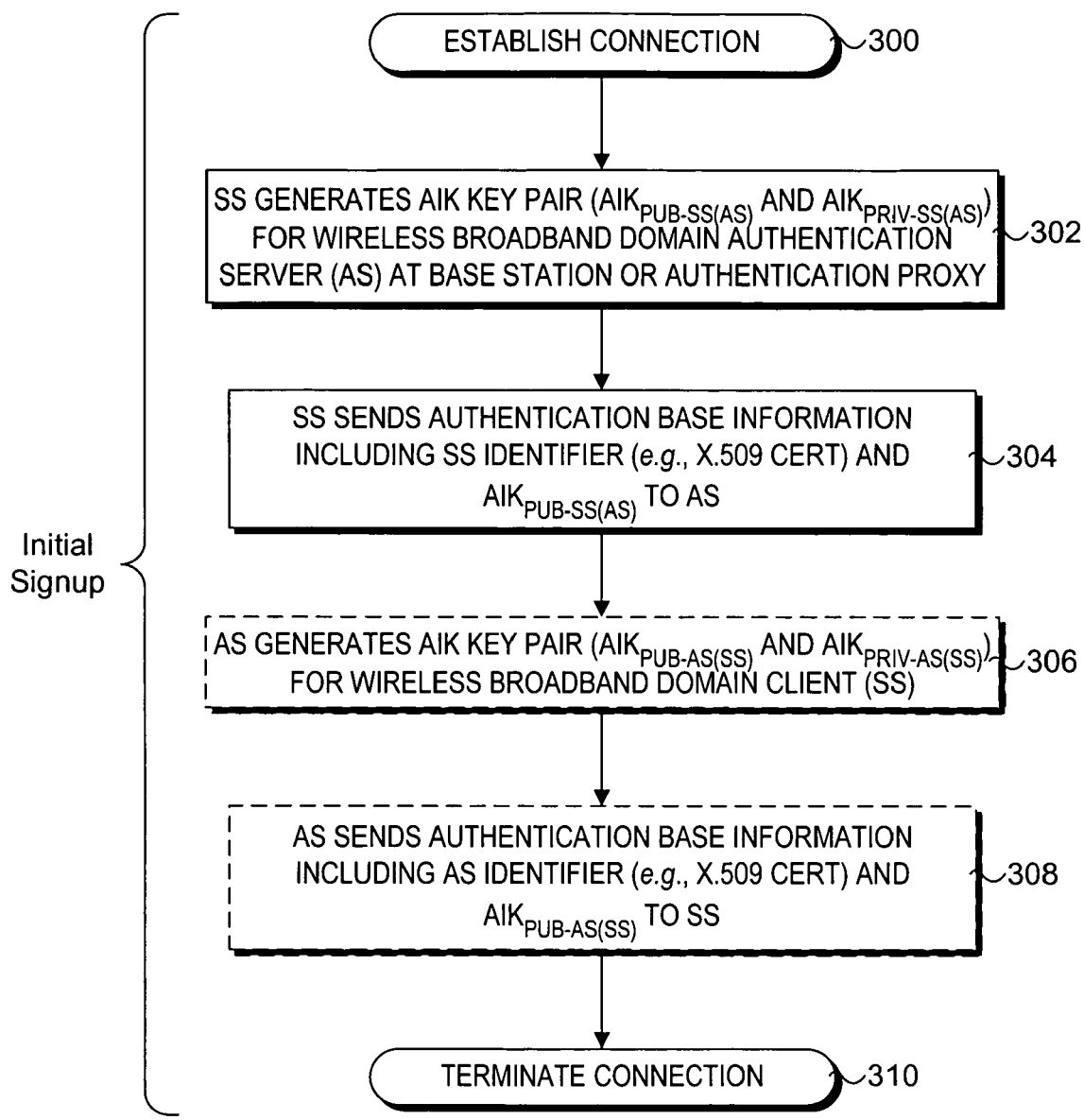
FIG. 3a is a flowchart illustrating operations performed during one embodiment of an initial signup operation during which attestation identity key (AIK) pairs are generated and the public AIK keys are exchanged between a subscriber station (SS) and a base station (BS)

With reference to FIG. 3a, one embodiment of the initial signup process begins with the SS initialization where the SS scans the downlink channel and establishes synchronization with a given BS. The SS obtains the transmit parameters via the Uplink Channel Descriptor (UCD) message and perform initial ranging, which includes transmit power adjustment and correct timing offset, and negotiate basic capabilities. These functions are indicated in block 300. Block 300 represents a basic unsecured broadband wireless connection between SS and BS. By necessity, an IEEE P802.16-REVd/D5-2004 network enables a basic, non-secure connection (i.e., a link via the physical broadband infrastructure) to be established to permit subsequent exchange of security data, which then may be used to support a secure connection over the wireless network.

In a block 302, the SS generates an AIK key pair comprising an asymmetric 2048-bit keys including a private AIK key ($AIK_{PRIV}$) and a public AIK key ($AIK_{PUB}$) that is specific to a broadband wireless domain authentication server. Typically, an authentication server (AS) will be operated by the service provider to authenticate clients (e.g., subscriber stations), with the physical location of the AS being transparent to the client SS. For example, the AS may be co-located at the base station the connection is established with, or may be located at a remote location operate as an authentication proxy. For instance, the proxy server may be located at a RAN or via a server coupled to network 100. Thus, if a wireless connection was established in block 300 and the authentication server resides at a location that is remote to the base station, the information will first be sent to the BS and then forwarded to the authentication server.

In one embodiment, an AIK key pair is generated for each wireless access domain for each subscriber station. At the same time, each AS may receive and store the public halves of the AIK key pairs from multiple subscriber stations. Accordingly, the nomenclature used for keys corresponding to unique service subscribers and/or authentication stations are depicted with corresponding subscripts, with the generator of the key first and the recipient target for the key following in parenthesis. For example, $AIK_{PUB-SSn(ASm)}$ identifies a public AIK key generated by subscriber station n and targeted for an authentication server m. In accordance with a further example shown in FIG. 7, the public AIK key for a subscriber station SS-A that is specific to an authentication server AS-A is labeled $AIK_{PUB-SS-A(AS-A)}$.

After the SS generates the AIK key pair and the unsecured wireless connection is established (it is noted that the AIK key pair may be generated in advance of the connection), the SS sends the AS baseline authentication information including an SS identifier and the SS AIK public key generated for the AS in a block 304. In general, the SS identifier contains information from which the SS can be uniquely identified. In one embodiment, the SS identifier is included as part of a digital certificate. In their simplest form, digital certificates, which are also referred to as "authentication certificates," contain a public key and a name. As commonly used, a digital certificate also contains an expiration date, information identifying the certifying authority that issued the certificate, a unique identifier (e.g., serial number), and perhaps other information. A digital certificate also contains a digital signature of the certificate issuer. The most widely accepted format for certificates is defined by ITU (International Telecommunications Union)-T X.509 international standard (IETF RFC (Internet Engineering Task Force Request for Comment) 2459). Accordingly, in one embodiment SS sends an ITU-T X.509 certificate (hereinafter referred to as an "X.509" certificate). In addition to X.509 certificates, other types of digital certificates may also be used.

The operations of the next two blocks (306 and 308) concern operations that are performed to support one embodiment of mutual authentication. Under mutual authentication, the SS authenticates the AS in addition to the AS authenticating the SS. Accordingly, in block 306, the AS generates as AIK pair that is specific to the SS, while in block 308 the public half of the AIK key pair is sent to the SS, along with an AS identifier, such as an X.509 certificate, for example. Blocks 306 and 308 are depicted in dashed form to indicate they are optional; for example, these operations are not performed for some implementations that do not support mutual authentication. After the AIK public key(s) have been transferred, the connection is terminated in accordance with an end block 310, completing the initial signup stage.

It is noted that the initial signup operations do not need to be performed using a wireless connection between an SS and a BS. Rather, in one embodiment, operations analogous to the foregoing are performed using a wired (e.g., copper twisted-pair, coaxial or optical fiber) network connection. For example, an AIK public key may be transferred over a secure Internet connection. In general, public keys may be sent "in the clear," meaning they may be sent over a public network without encryption. In contrast, private keys should never be sent in an unencrypted form.

Figure 3B:
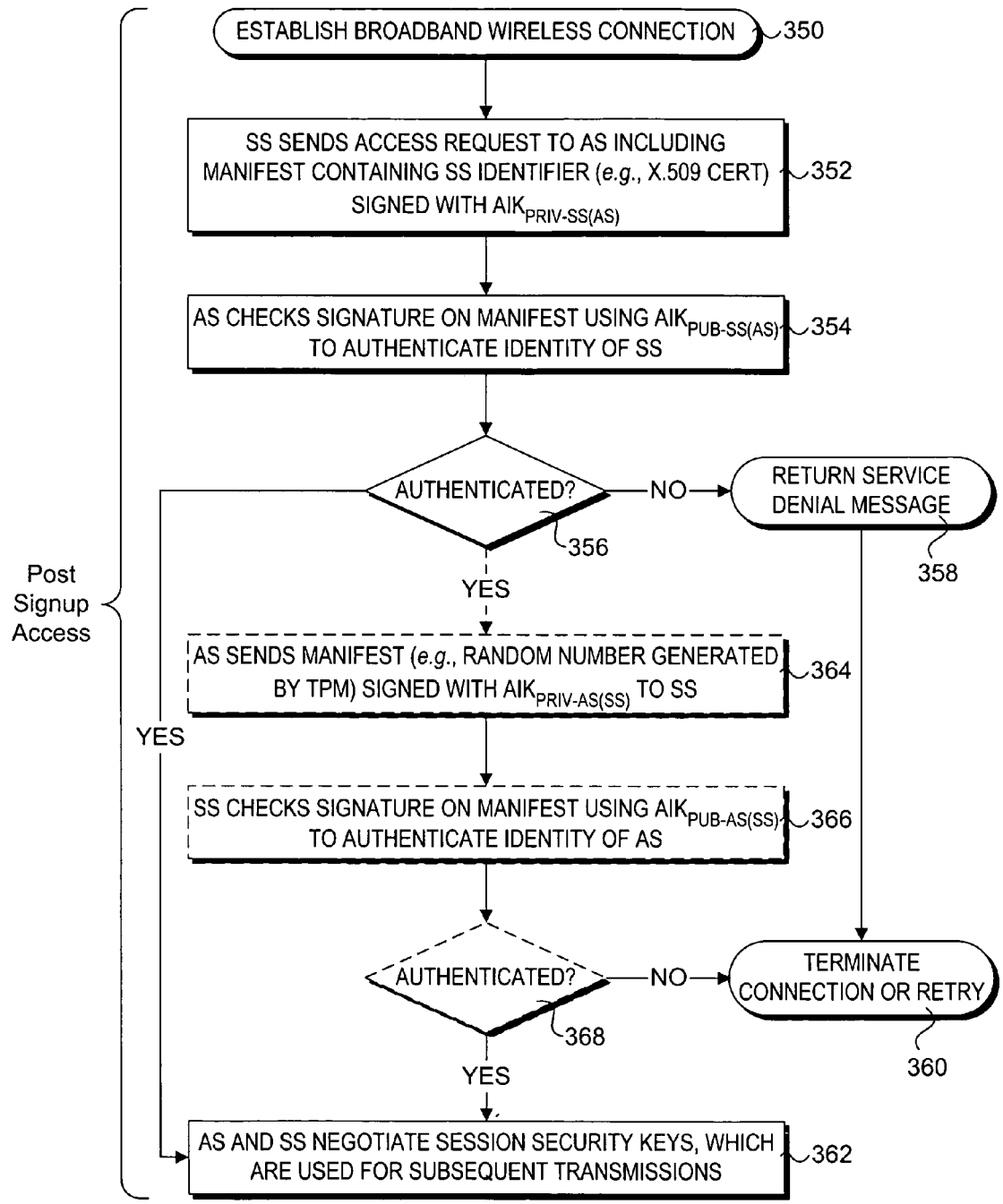
FIG. 3b is a flowchart illustrating operation and logic performed during one embodiment of a post-signup broadband wireless network access process under which client (SS) or mutual authentication is performed prior to establishing a secure session.

Operations and logic performed in connection with one embodiment of a post-signup access process are illustrated in the flowchart of FIG. 3b. The SS initialization process begins in a block 350 with the establishment of an unsecured broadband wireless connection. Although there is no security information that has been sent at this point, the AS will have some basic information identifying the SS—the SS's MAC address, which is unique to each device that may access the broadband network. Furthermore, in one embodiment, if a broadband wireless connection was used during the signup stage, the AS maps the security information sent by the SS to the SS's MAC address in the authentication server's database. Optionally, the SS's MAC address may be provided via an Interconnect connection during the signup process.

A broadband wireless connection will typically be initiated by an SS attempting to access services facilitated through a nearby base station. Accordingly, in a block 352, the SS sends an access request message via the BS to the authentication server, wherein the access request message includes a manifest containing an SS identifier, such as a digital certificate. A manifest typically comprises a hashed digest (e.g., blob of concatenated data), but may just comprise a wrapped digital certificate. In one embodiment, the manifest is encrypted with the SS's X.509 private key, which is asymmetric with and thus may be decrypted with the SS's X.509 public key that was previously sent to the AS.

In one embodiment, the manifest is signed with the SS's private AIK key (for the AS). Accordingly, upon receipt of the access request message, the AS checks the signature on the manifest using the SS's public AIK key that it was previously sent, as depicted by a block 354. If necessary, the manifest may first be decrypted with the SS's X.509 public key.

At this point, the AS has several pieces of information via which the client may be authenticated. These may include one or more of the SS's MAC address, an AIK-based digital signature for the SS, and the SS's X.509 digital certificate. Based on the foregoing authentication information, a determination is made in a decision block 356 to whether the SS is authenticated. If the answer is NO, the SS is not authenticated, and thus is not authorized to access the specific BS. Accordingly, a service denial message is returned to the SS in a return block 358 and the connection may be terminated via initiation by the AS or SS, or the SS may retry the authentication process, as depicted by an end block 360.

If only client authentication (e.g., authentication of SS) is to be performed, a YES authentication result causes the flowchart logic to proceed to a block 362, wherein the AS and SS negotiate session security keys that are employed for subsequent transmissions during the remaining connection session. Security key negotiation operations may be facilitated by one of several techniques known to those skilled in the network security arts. Details of one embodiment of a session key negotiation scheme are described below.

In one embodiment that supports mutual authentication, a YES result to decision block 356 causes the logic to proceed to a block 364. In this block, the AS sends a manifest that is signed with the AS's private AIK key. Since the SS initiated the connection, the SS presumably knows the identity of the AS. As a result, the content of the manifest is irrelevant, since the digital signature is being used to authenticate the AS and not the manifest contents. Thus, in one embodiment, the manifest is simply a random number generated by a TPM hosted by the authentication server platform.

As before, the AS AIK-based signature can be verified using the AS's AIK public key that was previously transferred to the SS during the signup process of FIG. 3a. A corresponding signature check is made in a block 366, wherein the AS AIK public key (for the SS) is used to attempt to decrypt the signature. The outcome of this determination is depicted by a decision block 368. If the authentication server is not authenticated (e.g., the signature cannot be read using the AS AIK public key for the SS), the connection may be terminated or a retry of the authentication sequence may be performed, as depicted by end block 360.

In one embodiment, a TPM is employed to provide another layer of security beyond the aforementioned schemes. Under this scheme, a secret (e.g., a configuration identifier) is "sealed" against a TPM by "imprinting" a trusted platform configuration. The sealing mechanism requires an identical trusted platform configuration (i.e., selected trusted platform firmware and/or software) to exist when data is "unsealed" as when the same data was sealed. If the trusted platform configuration differs, the data cannot be unsealed, and thus cannot be accessed. One advantage of this security scheme is that a rogue or otherwise unauthorized entity cannot gain access to either a particular sealed secret or data sent to an authorized entity holding the key to decrypt the data.

Figure 4A:
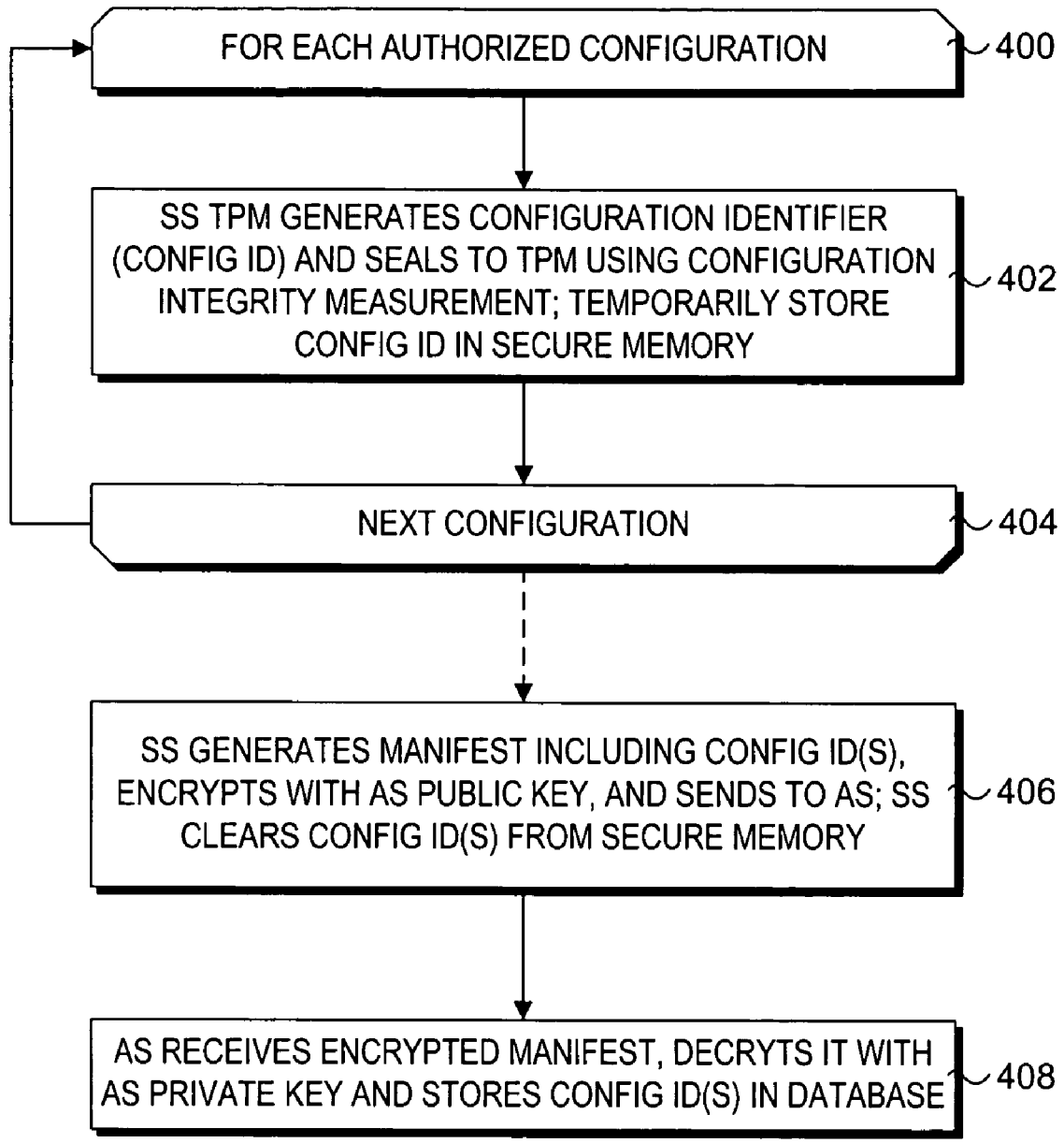
FIG. 4a is a flowchart illustrating operations performed in connection with the generation, distribution, and sealing of configuration identifiers that subsequently employed to verify a current configuration of an SS is an authentic configuration.

FIG. 4a shows a flowchart illustrating operations performed during one embodiment under which one or more configuration identifiers (Config_ID's) are sealed to a TPM. Each configuration identifier corresponds to a respective platform configuration. In turn, a given platform configuration may generally comprise a hardware and/or firmware configuration, a system configuration of one or more software components, or a combination of these.

A TPM is associated with a particular system (the TPM's platform), and is used to uniquely identify the system in a statistically-guaranteed manner. At the same time, a given system may have one or more platform configurations, wherein a platform configuration concerns the platform's firmware and/or software environment. In particular, the principle software of concern is the system's operating system. Depending on how the system is configured, it may be enabled to boot from multiple operating systems. Thus, each operating system, once loaded, would correspond to a respective platform configuration.

In addition, it may be possible to include user identification information in the platform configuration. For example, the operating system may store information relating to a current user. This information may be included in a configuration measurement, as described below.

Returning to the flowchart of FIG. 4a, the first operation, in a block 402, is to generate a configuration identifier and seal the Config_ID against the TPM using a configuration integrity measurement or set of integrity measurements. As depicted by start and end loop blocks 400, and 402, the operation of block 402 is performed for each authorized configuration, wherein an authorized system configuration corresponds to a specific system configuration that is authorized to access the broadband wireless network. Separate authorized system configurations may also exist for different services provided by the same broadband wireless service provider, such as high-speed broadband Internet, video streaming and Voice-over-IP (VoIP).

Figure 5A:
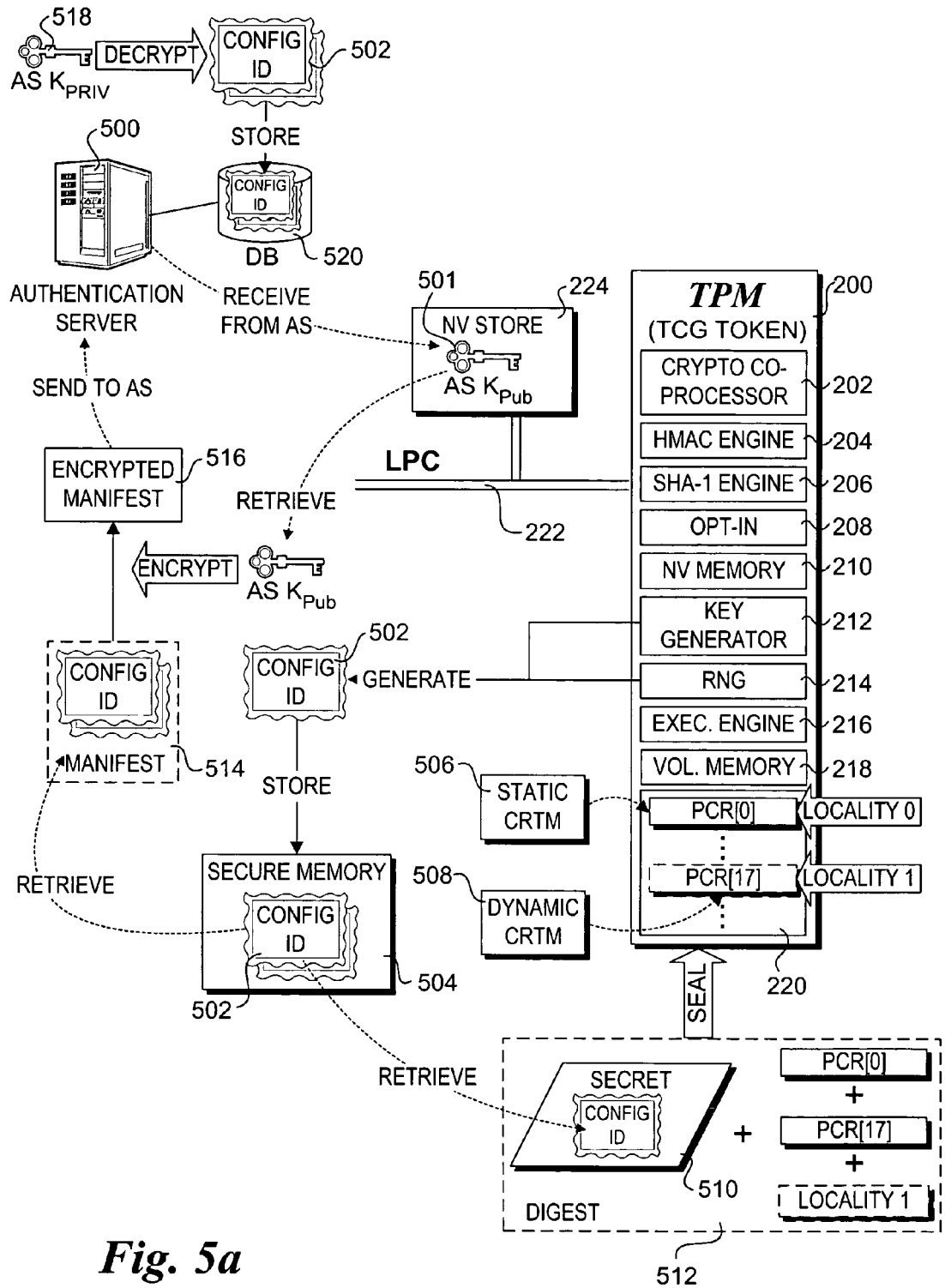
Figure 6A:
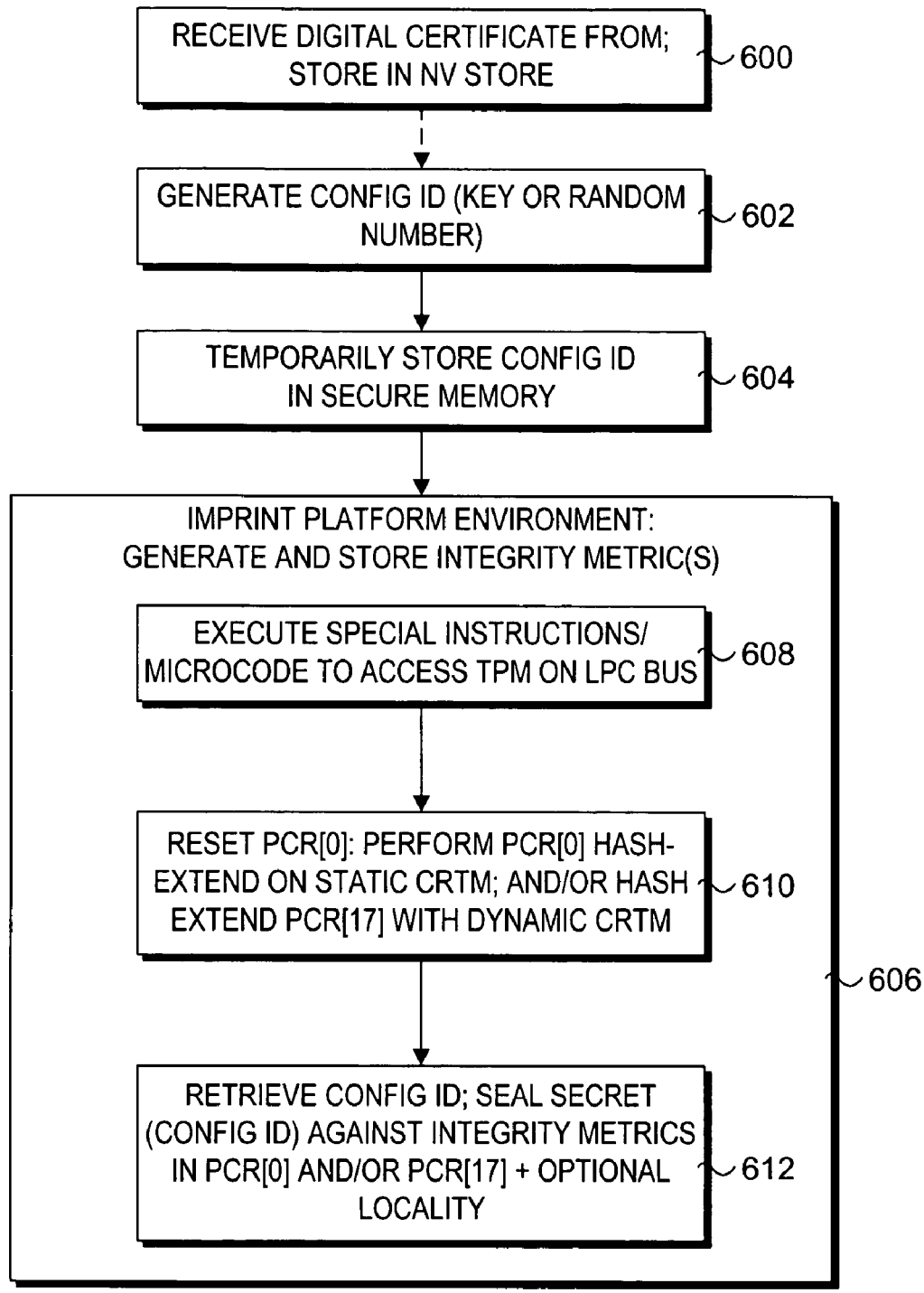
FIG. 6a is a flowchart illustrating details of TPM sealing operation under which a digest containing a configuration identifier is securely stored (sealed) against the TPM under an authorized SS platform configuration.
Figure 10:
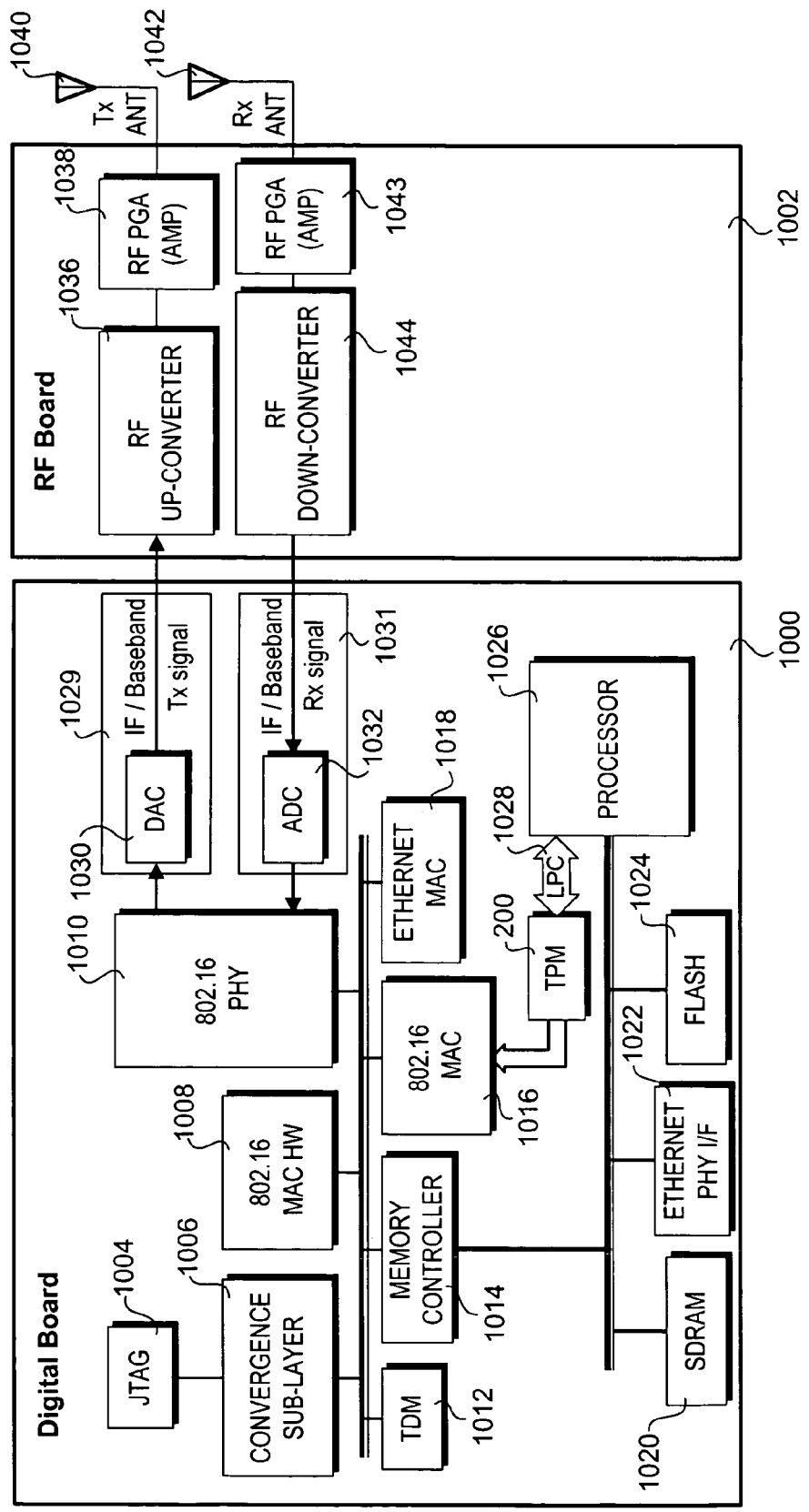
FIG. 10 is a schematic diagram of subscriber station apparatus via which aspects of the embodiments described herein may be practiced.

An exemplary process for sealing data against a TPM using an imprinted platform environment is shown in FIG. 5a, which includes details of TPM 200 shown in FIG. 2, with corresponding process operations depicted in the flowchart of FIG. 6a. Details of an IEEE P802.16-REVd/D5-2004 compliant system that is configured to implement aspects of the TPM operations described herein is shown in FIG. 10 and discussed below. Prior to the imprinting process, the SS will have received an X.509 digital certificate from the AS 500 and store the AS's X.509 public key 501 in a persistent store, such as NV store 224. These operations are depicted in a block 600. In a block 602 a configuration identifier 502 is generated. In respective embodiments, Config_ID 502 comprises a key generated by key generator 212 and a random number generated by random number generator 214. In both cases, the concept is to generate a configuration identifier that is unique and non-guessable. Furthermore, the Config_ID should not be related to or identify any information pertaining to the underlying platform configuration.

Upon being generated, Config_ID 502 is temporarily stored in secure memory 504, as depicted by a block 604. Secure memory corresponds to memory that may only be accessed by trusted agents. In one embodiment, the trusted memory is TPM volatile memory 218. In another embodiment, the trusted memory is system management random access memory (SMRAM), which may only be accessed while the processor (controlling access to the TPM) is in system management mode.

Under the next set of operations, depicted in as a block 606, the platform environment is imprinted. In one embodiment, the platform is configured such that special instructions and/or microcode are required to access certain devices coupled to LPC bus 222, via special bus cycle timing. These devices include TPM 200 and NV storage device 224. This provides an additional level of security between data stored in TPM 200 and attacks on the platform. Thus, in a block 608, the special instructions or microcode are executed to access the TPM.

In a block 610, a second level of security is provided by storing integrity metric data in one or more platform configuration registers 220. PCR's 220 are employed for securely storing data in a manner where certain authentication information must be provided to TPM 200 in order to access data sealed against the TPM using a TPM_Seal operation that references a particular PCR or set of PCR's.

A PCR is a 160-bit storage location for discrete integrity measurements. All PCR registers are shielded-locations and are inside of the TPM. The decision of whether a PCR contains a standard measurement or if the PCR is available for general use is deferred to the platform specific specification.

A large number of integrity metrics may be measured in a platform, and a particular integrity metric may change with time and a new value may need to be stored. It is difficult to authenticate the source of measurement of integrity metrics, and, as a result, a new value of the integrity metric cannot be permitted to simply overwrite an existing value. For instance, if this were permitted, a rogue entity could erase an existing value that indicates subversion and replace it with a benign value. Thus, if values of integrity metrics are individually stored, and updates of integrity metrics must be individually stored, it is difficult to place an upper bound on the size of memory that is required to store integrity metrics.

Each PCR is designed to hold a large number of measurements in its register. It does this by using a cryptographic hash and hashing all updates to a PCR. The pseudo code for this is:

$$PCR_i \text{ New} = \text{HASH }(PCR_i \text{ Old value}\|\text{value to add})$$

wherein the "||" symbol represents concatenation. Updates to a PCR register are sometimes referred to as "extending" the PCR, while the data measured to the PCR is sometimes called the "extend."

In one embodiment, PCR0 provides the capability of being reset. Accordingly, a first hash-extend operation (after a reset) may be performed in a manner that produces PCR0 values that are independent of previously stored register values. This is advantageous with respect to being able to store integrity metrics corresponding to a given platform environment, and then subsequently compare integrity metrics corresponding to a current platform environment with the given platform environment.

A platform environment may correspond to a platform's firmware or software configuration, or a combination of the two. More specifically, an integrity metric corresponding to a platform environment may reflect a single environment component (i.e., firmware/software component), or a combination of components used to form an environment that exists at the time the integrity metric is measured. The most trusted measurements concern core root of trust measurements (CRTMs). A core root of trust measurement based on a platform's firmware is referred to as a static CRTM 506. A core root of trust measurement based on a platform's software (e.g., core operating system components) is referred to as a dynamic CRTM 508.

In one embodiment, the operations of block 610 pertain to use of a static CRTM. In one embodiment, a static CRTM is created via a measurement of the platform's base firmware. The base firmware is a portion of firmware provided by the platform that cannot be partially replaced. The CRTM should be an immutable portion of the platform's initialization code that executes upon any platform reset. The trust in the platform is based on the CRTM. The trust in all measurements is based on the integrity of this component. Thus, the static CRTM is derived from a measurement of "static" firmware.

In one embodiment, a static CRTM is assigned to a platform configuration register 220 referred to a PCR[0]. To store the static CRTM, PCR[0] is reset, and a hash-extend operation is performed on this PCR using an integrity measurement of the base firmware as the extend. In this context, the hash-extend operates on a reset register value (i.e., 0), and so the hash-extend operation simply reflects a hash of the base firmware.

In another embodiment, a dynamic CRTM is used as the platform CRTM in block 610. In one embodiment, integrity measurements corresponding to a dynamic CRTM are stored in a PCR registered PCR[17]. A dynamic CRTM is generated using a hash-extend operation in a similar manner to the foregoing static CRTM, except in this instance a trusted portion of system software (e.g., the OS kernel) is measured. In yet another embodiment, both a static CRTM and dynamic CRTM is measured and stored in respective PCR registers PCR[0] and PCR[17] in block 610.

Following the generation of a static or dynamic CRTM, the next operation is performed in a block 612, wherein the Config_ID 502 is retrieved from secure memory 504 and is stored such that it may not be accessed by outside agencies. In one embodiment, this is performed by sealing a secret 510 comprising Config_ID 502A against the integrity metric stored in one or more PCRs 220. In essence, what this does is require the same integrity metrics to exist in the one or more PCRs (as applicable) before the sealed value (Config_ID) may be unsealed, as described below.

Sealing operation is performed via the TPM_Seal command. The SEAL operation allows software to explicitly state a future "trusted" configuration that the platform must be in for the secret data (stored via the TPM_Seal command) to be revealed. The SEAL operation also implicitly includes the relevant platform configuration (PCR-values) when the SEAL operation was performed. The SEAL operation uses the tmpProof value to BIND a BLOB (Binary Large Object) to an individual TPM. The BLOB is also referred to as a "digest." To retrieve the secret, an UNSEAL operation is performed using the TPM_Unseal command. If the UNSEAL operation succeeds, proof of the platform configuration that was in effect when the SEAL operation was performed is returned to the caller, as well as the secret data. In one embodiment, a PCR provides a means for storing indicia identifying a processor locality at the time the secret is sealed; thus, the same locality is required to unseal the secret. For example, environments under firmware, software (i.e., OS) and processor control have different levels of locality.

In response to the TPM_Seal command, external data (the secret) is concatenated with a value of an integrity metric sequence and encrypted under a parent key. The TPM_Unseal command may be subsequently used to decrypt the BLOB using the parent key and export the plaintext data if the current integrity metric sequence inside the referenced TPM PCRs matches the value of integrity metric sequence inside the BLOB. The integrity metric in the current example is the value in PCR[0], PCR[17], or the combination of the two PCRs. In one embodiment, PCR[0] may be accessed via any locality. In one embodiment, a locality of 1 or greater is required to access PCR[17], such that this locality value is inherently stored in PCR17.

Details of an exemplary SEAL operation are shown in FIG. 5a. As depicted, the secret 510 comprises Config_ID 502. In one embodiment, secret 510 is concatenated with the value in PCR[0] to form a digest 512. In another embodiment, secret 510 is concatenated with the values in PCR[0] and PCR[17] to form digest 512. Optionally, the locality may also be concatenated in forming the digest. The digest 512 is then sealed to TPM 200 using the TMP_Seal command (referencing the particular digest components). This completes the operation of imprinting the platform environment.

As a result of the operations of blocks 400, 402, and 404, one or more configuration identifiers will be generated, sealed against the TPM, and stored in secure memory via internal TPM operations. In a block 406, the SS generates a manifest 514 including the one or more Config_IDs, encrypts the manifest with the authentication server's public key 500 and sends the encrypted manifest 516 to the AS. The SS then clears any Config_ID(s) 502 from secure memory 504. The AS receives the encrypted manifest, decrypts it with the AS's private key 518, extracts the Config_ID(s) 502 and stores corresponding data in its authentication database 520.

Figure 7:
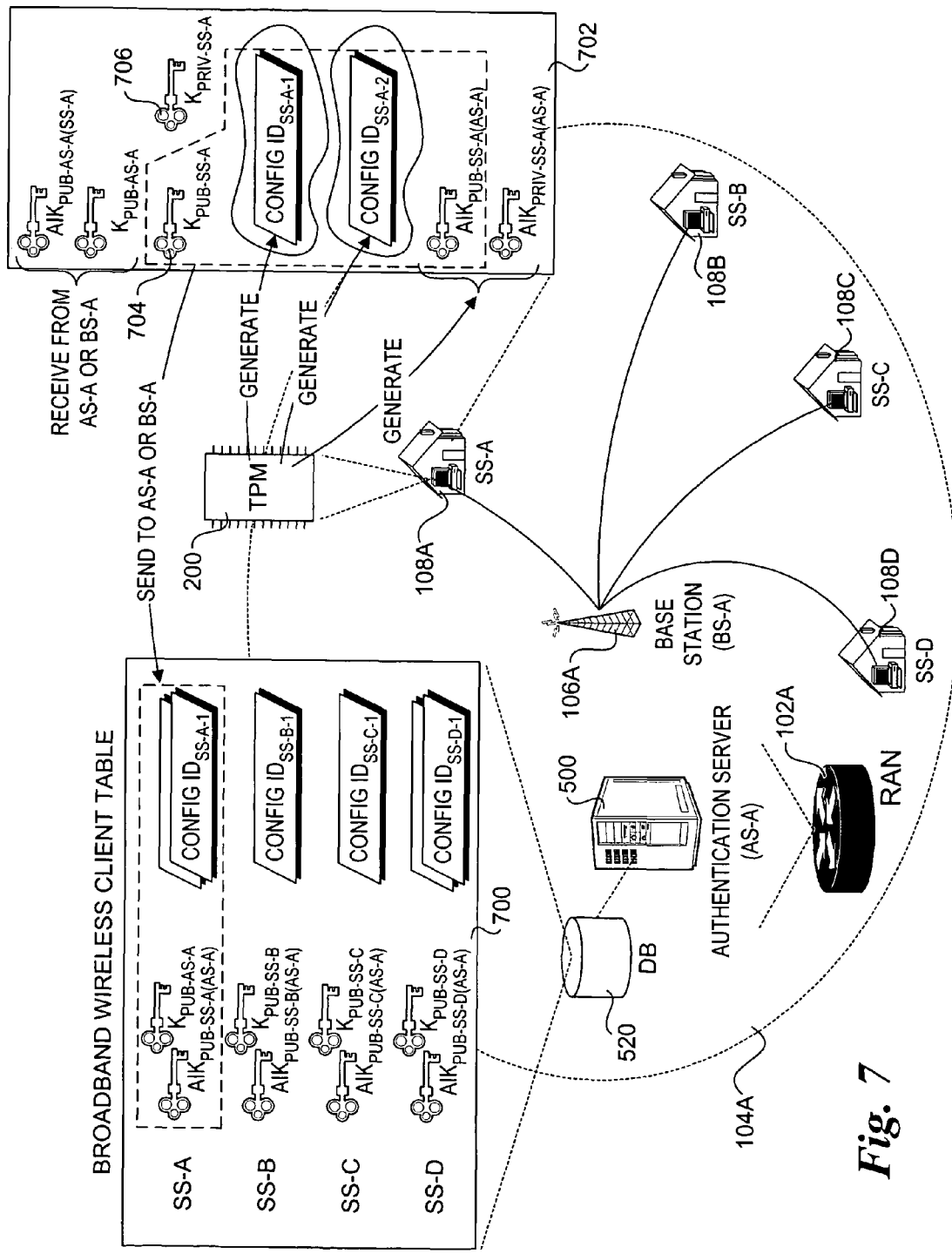
FIG. 7 is a schematic diagram of on of the cells of the broadband wireless network of FIG. 1, further illustrating various keys and configuration information that resides on an authentication server and an SS after exchanging keys and identification information during the signup process.

The results of this process are depicted in FIG. 7. In particular, a broadband wireless client table 700 hosted by authentication database 520 is depicted that includes a set of table entries for each subscriber station SS-A, SS-B, SS-C, and SS-D. In one embodiment, the entries include the SS's AIK public key, the SS's X.509 public key, and the Config_ID(s) for the subscriber station. In addition, the authentication database may include the MAC address for each SS device, either in the client table 700 (not shown) or a linked table (not shown).

FIG. 7 also shows an exemplary set of keys and Config_ID's 702 that are generated or received by subscriber station SS-A. In one embodiment, the SS-A public keys 704 and 706 are generated by a TPM 200 hosted by subscriber station SS-A's system, and the corresponding X.509 certificate is self-signed.

Figure 4B:
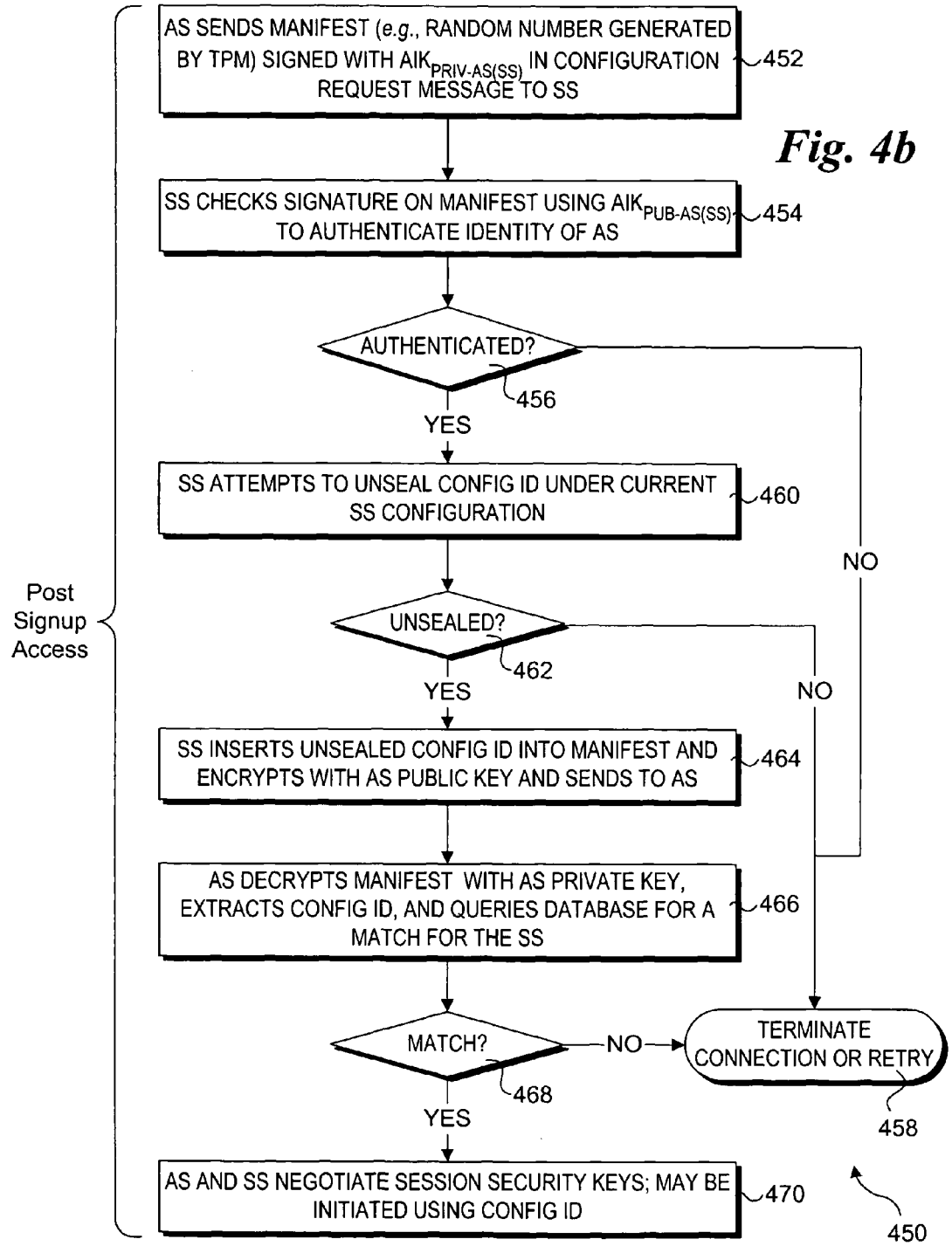
FIG. 4b is a flowchart illustrating operations and logic performed in connection with a post signup access sequence in which a configuration of an SS is authenticated by attempting to unseal a configuration identifier in view of current configuration integrity measurements.

Details of additional operations performed by in a post signup access process 450, according to one embodiment, are shown in FIG. 4b. The post signup access process include operations up to decision block 356 in the flowchart of FIG. 3b, and resumes in a block 452, wherein the AS sends a manifest signed with its private AIK key in a configuration identifier (Config_ID) request message to the SS. As with the manifest for the operation of block 364, the particular manifest value is irrelevant; in one embodiment, a random key generated by a TPM in the authentication server is used.

Upon receiving the signed manifest, the SS authenticates the signature in a block 454, resulting in an authentication determination in accordance with a decision block 456. If the signature cannot be read, the connection may be terminated or authentication retried, as depicted by an end block 458.

Figure 5B:
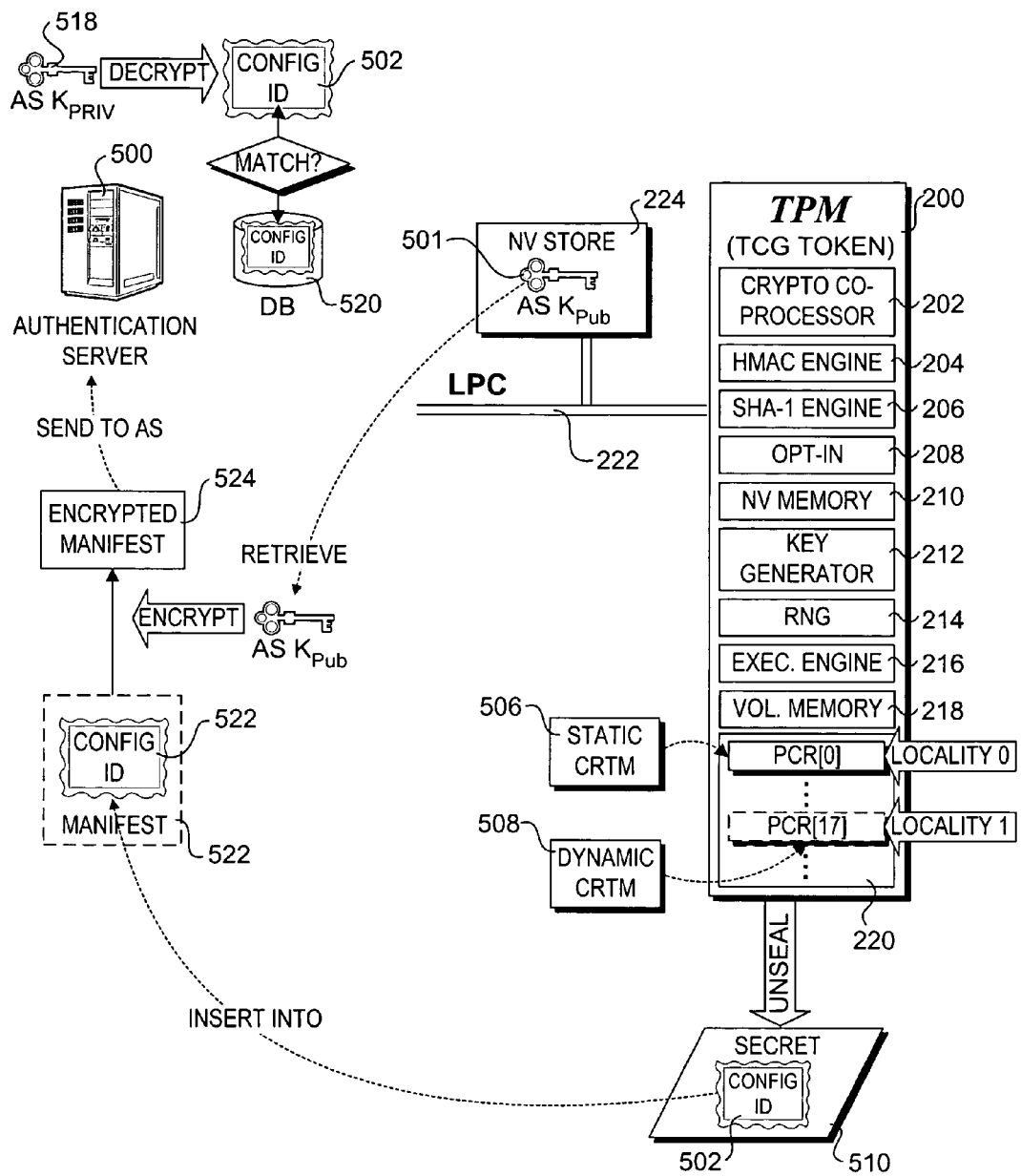
FIG. 5b is a schematic diagram illustrating operations in accordance with the flowchart of FIG. 4b.

If the AS is authenticated via the signature, the process continues at a block 460, wherein the AS attempts to unseal the Config_ID under the current SS configuration. Details of the unseal process are shown in FIG. 5b. As discussed above, the corollary of sealing is unsealing the sealed data. With reference to the schematic diagram of FIG. 5b and the flowchart of FIG. 6b, an exemplary unsealing operation corresponding to the foregoing seal operation begins in a block 650, wherein special instructions and/or microcode are used to access TPM 200 on LPC bus 222.

Next, in a block 652, the TMP_Unseal command is issued, referencing any applicable PCRs that where referenced in the corollary SEAL operations. In this example, the TMP_Unseal command will reference PCR[0] and/or PCR[17] in its list of arguments (depending on the combination of integrity metrics used above). This invokes the operations depicted in a block 654, wherein hash extend operations are performed on PCR[0] and/or PCR[17] using current integrity metrics corresponding to current static CRTM and/or dynamic CRTM measurements, as applicable. If the integrity metrics have not changed, the corresponding extended hash values will remain the same. In contrast, if the integrity metrics have changed, so will the extended hash values.

Figure 6B:
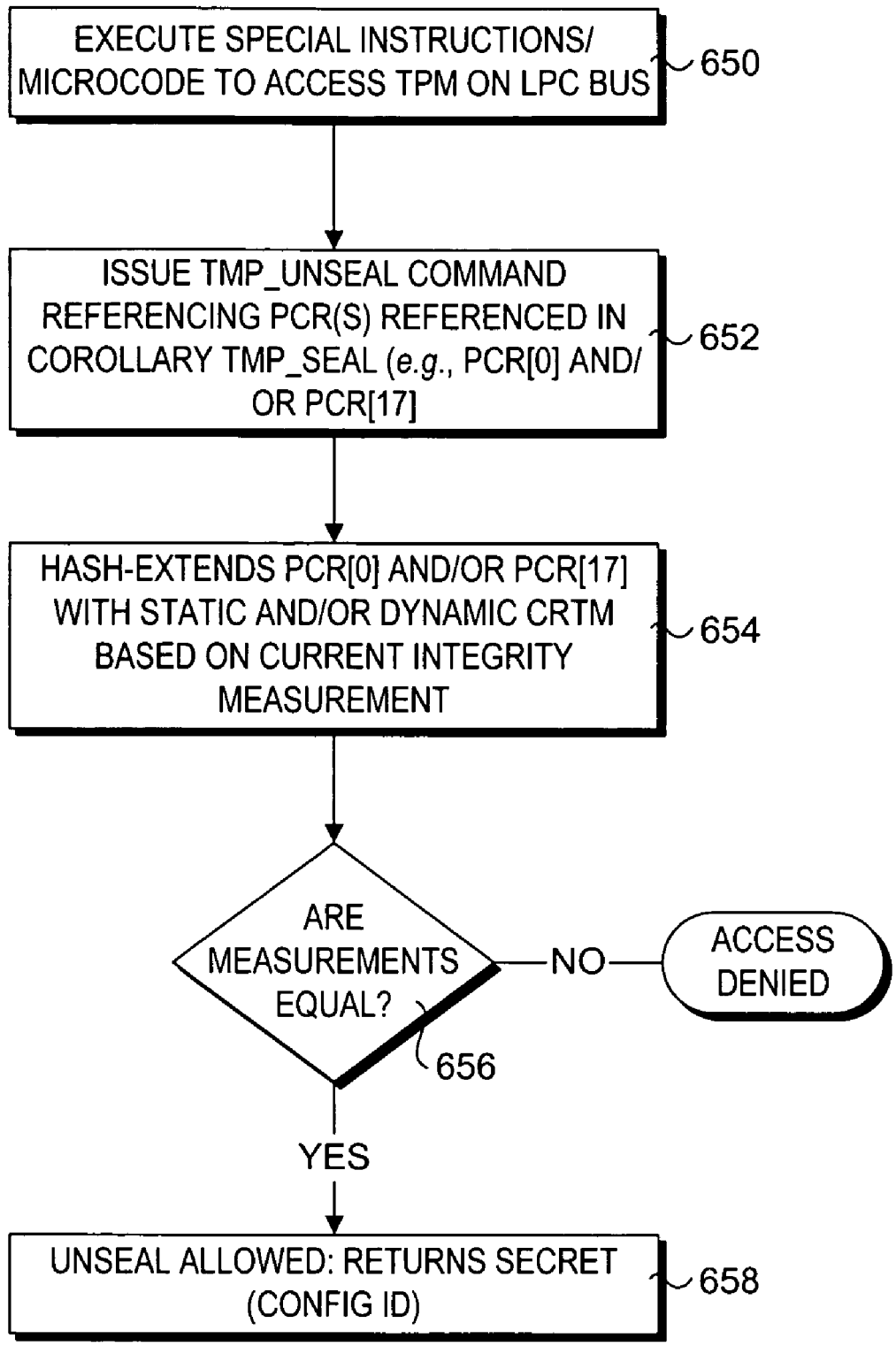
FIG. 6b is a flowchart illustrating details of a TPM unseal operation under which the digest may only be unsealed (retrieved from the secure store) if the current SS platform configuration matches the authorized configuration.

The logical result of the foregoing is depicted in a decision block 462 in FIG. 4b and in a decision block 656 in FIG. 6b. Per the TPM design, if the current integrity metrics do not match the corresponding integrity metrics that existed at the time the corollary SEAL operations was performed, access to the secret data (in the sealed digest) is denied. If the integrity metrics match, access is allowed, with the seal secret comprising the Config_ID returned in a block 658; this result is also depicted by the logic flow to a block 464 in FIG. 4b. If a match does not result, the connection is terminated in end block 458.

In block 464, the SS insert the unsealed Config_ID 502 in a manifest 522, encrypts the AS's public key 501 and sends the encrypted manifest 524 to the AS 500. Upon receipt, the AS decrypts the manifest with its private key in a block 466 to extract the Config_ID and queries it authentication database for a match for the SS. If a match exists, the result of a decision block 468 is YES, completing authentication of the SS. The logic then proceeds to a block 470, wherein the AS and SS negotiate session security keys. In one embodiment, the negotiation of the session security keys is initiated using the Config_ID.

The foregoing configuration authentication scheme provides multiple layers of security for both the SS and the AS. From the SS's owner's perspective, the owner may want to prevent unauthorized users from accessing the broadband wireless network, particularly if a charge is accrued per usage. The platform integrity check effectuated through the seal/unseal TPM operations helps prevent authorized users from accessing the broadband wireless network. For example, if a platform is compromised (e.g., through a hacker), the configuration will change, and the integrity measurement will not match the measurement made when the Config_ID was sealed to the TPM.

From the AS's perspective, an extra layer of security is also provided. In theory, a rogue entity could gain control of an SS device and attempt to cause damage to the broadband wireless infrastructure. As before, in order to gain access, the configuration of the SS will usually have to be modified, which could be detected by the configuration integrity check.

In addition to sealing a generated configuration identifier to the TPM, a Config_ID for one embodiment is simply a PCR register value. A copy of the PCR register value is sent to the AS as the Config_ID during the signup process. Subsequently, the current value of the PCR (rather than the unsealed Config_ID) is retrieved from the same PCR, encrypted, and sent to the AS in place of the operation shown in block 466. The encrypted PCR value is then decrypted and compared with the earlier sent PCR value used for the Config_ID to authenticate the SS configuration.

Figure 8:
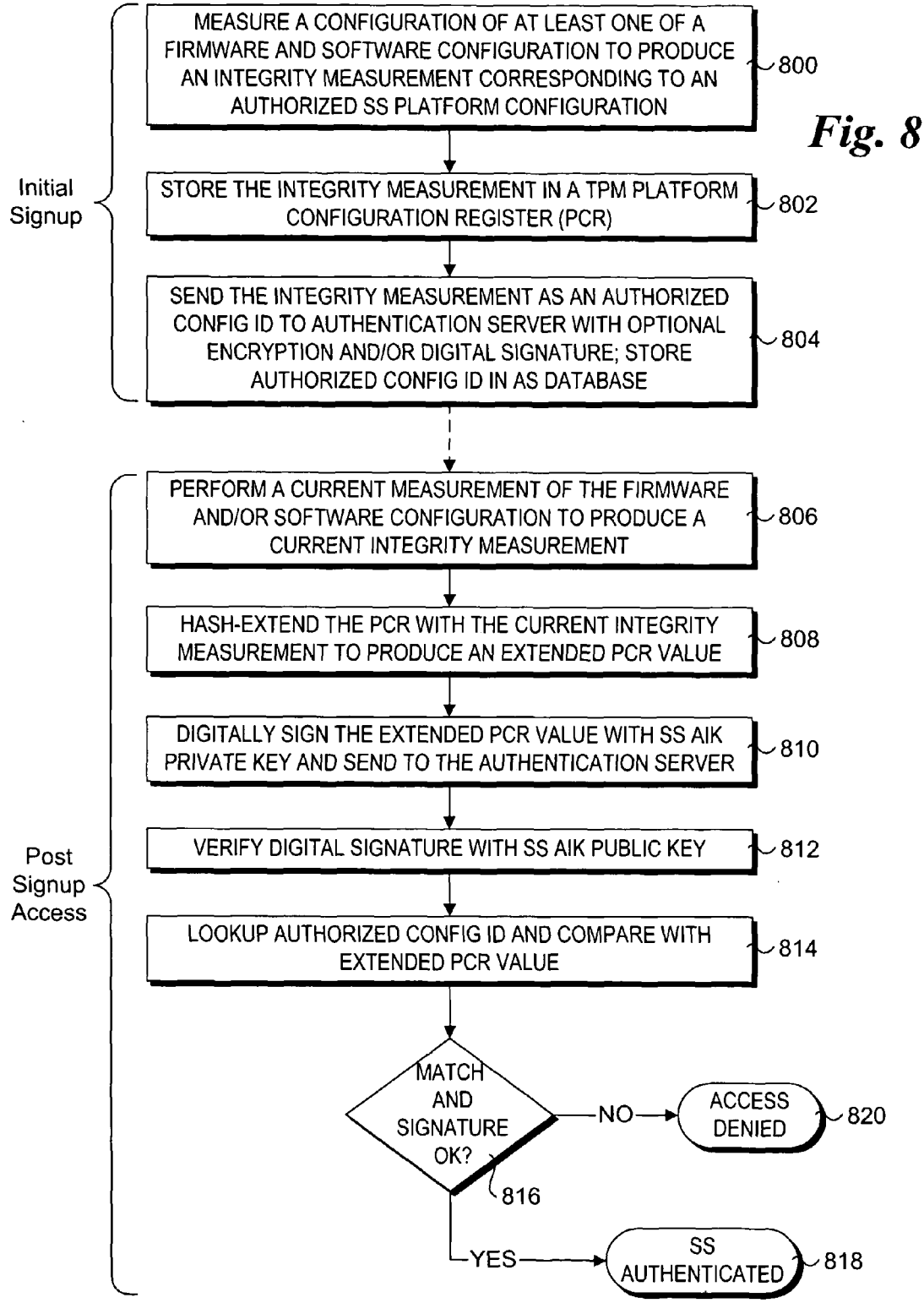
FIG. 8 is a flowchart illustrating operations performed under an authentication scheme in which a platform configuration integrity measurement is used to authenticate a platform configuration; according to one embodiment of the invention.

Further details of one embodiment of this process are shown in the flowchart of FIG. 8. As before, the process includes an initial signup phase and a post signup access phase. The initial signup phase begins in a block 800, wherein a measurement of at least one of the SS platform's authorized firmware and software configuration(s) is performed to produce an integrity measurement corresponding to the authorized configuration(s). The integrity measurement is then stored in an appropriate PCR in a block 802, and sent to the AS as an authorized Config_ID in a block 804. As above, the integrity measurement may be encrypted and/or digitally signed with appropriate keys. The AS extracts the Config_ID and stores it in its database, which completes the initial signup process.

In response to initiation of a post-signup access, the SS will receive an authentication request message or send the following in an authentication request. First, in a block 806, a current measurement of the firmware and/or software configuration (corresponding to the earlier measurement) is made to produce a current integrity measurement. The appropriate PCR is then hash-extended with the current integrity measurement in a block 808. The hash-extended PCR value is then extracted, digitally signed with the SS's AIK private key, and sent to the AS in a block 810. Upon receipt, the AS authenticates the digital signature using the SS's AIK public key that it has previously received.

As discussed above, a hash extend of a PCR using an integrity measurement that is the same as the current PCR value will not change the value, indicating the configuration has not changed. Accordingly, the authorized Config_ID is retrieved from the AS database using a query including an SS identifier as an input and compared with the hash-extended (i.e., current) PCR value. If the values match, and the digital signature is authentic, the SS is authenticated, as depicted by a decision block 816, and an end block 818. If either of these conditions do not exist, the answer to decision block 816 is NO, and the access is denied, as depicted by an end block 820.

In accordance with one set of embodiments, the foregoing security measures are implemented within a privacy management framework defined by the IEEE P802.16-REVd/D5-2004 standards. More specifically, the IEEE P802.16-REVd/D5-2004 security measures, which are covered by the IEEE P802.16-REVd/D5-2004 Privacy standard, are implemented via the IEEE P802.16-REVd/D5-2004 privacy sub-layer.

The IEEE P802.16-REVd/D5-2004 Privacy standard provides subscribers with privacy across a fixed broadband wireless network. It does this by encrypting the transmitted data bursts between SS and BS. In addition, privacy provides operators with strong protection from theft of service. The BS protects against unauthorized access to these data transport services by enforcing encryption of the associated service flows across the network. Privacy employs an authenticated client/server key management protocol in which the BS, the server, controls distribution of keying material to client SS. Additionally, the basic privacy mechanisms are strengthened by adding digital-certificate-based SS authentication to its key management protocol.

The IEEE P802.16-REVd/D5-2004 Privacy standard includes two component protocols, as follows:

a) An encapsulation protocol for encrypting packet data across the fixed broadband wireless access network. This protocol defines (1) a set of supported cryptographic suites, i.e., pairings of data encryption and authentication algorithms, and (2) the rules for applying those algorithms to a MAC PDU (protocol data unit) payload.

b) A key management protocol (Privacy Key Management, or PKM providing the secure distribution of keying data from BS to SS. Through this key management protocol, SS and BS synchronize keying data; in addition, the BS uses the protocol to enforce conditional access to network services.

An SS uses the PKM protocol to obtain authorization and traffic keying material from the BS, and to support periodic reauthorization and key refresh. The key management protocol uses X.509 digital certificates, the RSA public-key encryption algorithm, and strong symmetric algorithms to perform key exchanges between an SS and a BS. The PKM protocol adheres to a client/server model, where the SS, a PKM "client," requests keying material, and the BS, a PKM "server," responds to those requests, ensuring that individual SS clients receive only keying material for which they are authorized. The PKM protocol uses MAC management messaging, i.e., PKM-REQ (request) and PKM-RSP (response) messages defined by the IEEE P802.16-REVd/D5-2004 specification.

The PKM protocol uses public-key cryptography to establish a shared secret (an Authorization Key (AK)) between an SS and a BS. The shared secret is then used to secure subsequent PKM exchanges of traffic encryption keys (TEKs). This two-tiered mechanism for key distribution permits refreshing of traffic encryption keys without incurring the overhead of computation-intensive public-key operations. A BS authenticates a client SS during the initial authorization exchange. Each SS carries a unique X.509 digital certificate issued by the SS's manufacturer. The digital certificate contains the SS's Public Key and SS MAC address. When requesting an Authorization Key, an SS presents its digital certificate to the BS. The BS verifies the digital certificate, and then uses the verified Public Key to encrypt an Authorization Key, which the BS then sends back to the requesting SS.

The BS associates an SS's authenticated identity to a paying subscriber, and hence to the data services that subscriber is authorized to access. Thus, with the Authorization Key exchange, the BS establishes an authenticated identity of a client SS and the services (i.e., specific traffic encryption keys) the SS is authorized to access.

Privacy management is also facilitated via security associations. A Security Association (SA) is the set of security information a BS and one or more of its client SSs share in order to support secure communications across IEEE 802.16-based broadband wireless network. Three types of SAs are defined: Primary, Static, and Dynamic. Each SS establishes a Primary Security association during the SS initialization process. Static SAs are provisioned within the BS. Dynamic SAs are established and eliminated, on the fly, in response to the initiation and termination of specific service flows. Both Static and Dynamic SAs can by shared by multiple SSs.

An SA's shared information includes the Cryptographic Suite employed within the SA. The shared information may include Traffic Encryption Keys (TEKs) and Initialization Vectors. The exact content of the SA is dependent on the SA's Cryptographic Suite.

SAs are identified using SAIDs (SA identifiers). Each SS establishes an exclusive Primary SA with its BS. The SAID of any SS's Primary SA is equal to the Basic connection identifier (CID) of that SS. Using the PKM protocol, an SS requests from its BS an SA's keying material. The BS ensures that each client SS only has access to the SAs it is authorized to access.

An SA's keying material (e.g., Data Encryption Standard (DES) key and CBC Initialization Vector) has a limited lifetime. When the BS delivers SA keying material to an SS, it also provides the SS with that material's remaining lifetime. It is the responsibility of the SS to request new keying material from the BS before the set of keying material that the SS currently holds expires at the BS. The PKM protocol specifies how SS and BS maintain key synchronization.

Figure 9:
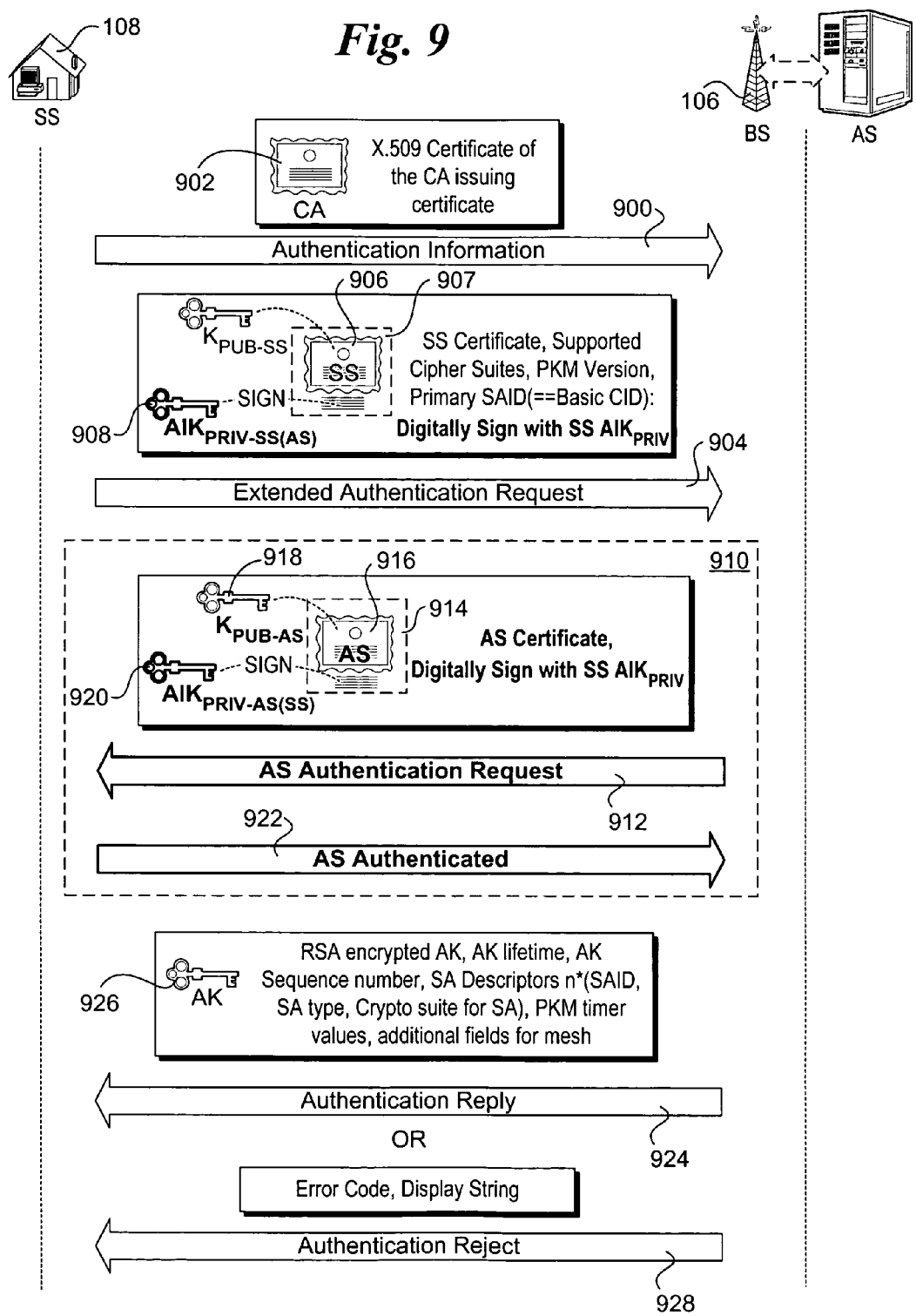
FIG. 9 is a schematic diagram illustrating a message exchange sequence via which a subscriber station and, optionally, a base station may be authenticated using an extension to the privacy key management (PKM) protocol.

In one embodiment, a client authentication process is performed using an extended version of the PKM v1 (version 1). To more clearly identify the extensions, modifications to the specification's authorization message sequence is illustrated in bold in FIG. 9. It will be understood that the initial signup operations of FIG. 3a, as applicable, will have been performed prior to the subsequent access process shown in FIG. 9.

After a basic unsecured connection is initiated, the authentication sequence begins with an SS 108 sending an Authentication Information message 900 to BS 106. The Authentication Information message contains the SS manufacturer's X.509 certificate 902, issued by the manufacturer itself or by an external certificate authority (CA). The Authentication Information message is strictly informative, and the BS may choose to ignore it. However, it does provide a mechanism for a BS to learn the manufacturer certificate of its client SS.

The SS then sends an extended Authorization Request message 904 to its BS immediately after sending the Authentication Information message. This is a request for an AK, as well as for the SAIDs identifying any Static SAs the SS is authorized to participate in. The PKM V1 standard Authorization Request message includes a) a manufacturer-issued X.509 certificate 906 for the SS, which includes the SS's public key $K_{Pub\text{-}SS}$;

b) a description of the cryptographic algorithms the requesting SS supports; an SS's cryptographic capabilities are presented to the BS as a list of cryptographic suite identifiers, each indicating a particular pairing of packet data encryption and packet data authentication algorithms the SS supports; and c) the SS's Basic CID. The Basic CID is the first static CID the BS assigns to an SS during initial ranging—the primary SAID is equal to the Basic CID.

Under the extended Authorization Request, the foregoing is wrapped in a manifest 907 that is digitally signed by the SS using the SS's AIK private key 908. In response to the extended Authorization Request, the AS authenticates the SS by performing a signature check using the SS's AIK public key that was sent to it during the signup process in a manner analogous to block 354 of FIG. 3b. If the AS is authenticated, the process is allowed to continue.

As illustrated by the dashed box 910, an optional set of operations corresponding to authentication of the AS may be performed, in one embodiment. The AS authentication operations are analogous to those shown in blocks 364, 366, and 368 of FIG. 3b. The process begins by sending an AS Authentication Request message 912 from BS 108 to AS 106. The AS Authentication Request includes a manifest 914 comprising an AS X.509 certificate 916 containing AS public key 918, which is digitally signed with the AS's private AIK key 920.

In response to AS Authentication Request 912, the SS returns an AS Authenticated message 922 if the AS is authenticated or an Authentication Rejection message (not shown) if the AS is not authenticated.

In further response to extended Authorization Request (and in response to an AS Authenticated message, if AS authentication is performed), BS 106 determines the encryption algorithm and protocol support it shares with the SS, activates an AK for the SS, encrypts it with the SS's public key $K_{Pub\text{-}SS}$, and sends it back to SS 108 in an Authorization Reply message 924. The authorization reply includes:

a) an AK 926 encrypted with the SS's public key $K_{Pub\text{-}SS}$;

b) a 4-bit key sequence number, used to distinguish between successive generations of AKs;

c) an AK lifetime; and d) the identities (i.e., the SAIDs) and properties of the single primary and zero or more static SAs the SS is authorized to obtain keying information for.

If the SS is not properly authenticated, or its requested access is otherwise rejected, BS 106 sends SS 108 an authorization rejection message 928, which includes an error code and a display string containing an error message.

The BS, in responding to an SS's Authorization Request, determines whether the requesting SS, whose identity was authenticated through the SS AIK private key signature, is authorized for basic unicast services, and what additional statically provisioned services (i.e., Static SAIDs) the SS's user has subscribed for. In is noted that the protected services a BS makes available to a client SS can depend upon the particular cryptographic suites SS and BS share support for.

An SS periodically refreshes its AK by reissuing an Authorization Request to the BS. Reauthorization is identical to authorization with the exception that the SS does not send Authentication Information messages during reauthorization cycles. Timing for reauthorization is dictated by an authorization state machine, which indicates when Authentication Information messages are sent.

To avoid service interruptions during reauthorization, successive generations of the SS's AKs have overlapping lifetimes. Both SS and BS are able to support up to two simultaneously active AKs during these transition periods. The operation of the Authorization state machine's Authorization Request scheduling algorithm, combined with the BS's regimen for updating and using a client SS's Authorization Keys, ensures that the SS can refresh TEK keying information without interruption over the course.

In response to successful client authorization (as indicated by receiving an Authorization Reply message), session security key negotiation operations are performed. Session key negotiation begins with an SS starting a separate TEK state machine for each of the SAIDs identified in the Authorization Reply message. Each TEK state machine operating within the SS is responsible for managing the keying material associated with its respective SAID. TEK state machines periodically send Key Request messages to the BS, requesting a refresh of keying material for their respective SAIDs.

Under PKM v1, the BS responds to a Key Request with a Key Reply message, containing the BS's active keying material for a specific SAID. The TEK in the Key Reply is triple DES (encrypt-decrypt-encrypt or EDE mode) encrypted, using a two-key, triple DES key encryption key (KEK) derived from the AK.

In general, elements of the other authentication schemes described above may be exchanged using similar extensions to the PKM specification. More specifically, the PKM specification provides a mechanism for defining extensions via a version numbering scheme, wherein an extension to the PKM v1 base protocol may be identified by changing the version number in the PKM message header. Details of the PKM message header, along with other detail pertaining to PKM operations are disclosed in the IEEE P802.16-REVd/D5-2004 specification.

FIG. 10 shows a block diagram of broadband wireless system architecture suitable for use as a subscriber station or base station under the IEEE P802.16-REVd/D5-2004 specification. The architecture includes a digital board 1000 and a radio frequency (RF) board 1002. In general, digital board 1000 is responsible for performing various process operations discussed herein. Meanwhile, RF board 1002 handles the generation and reception of RF signals in accordance with the IEEE P802.16-REVd/D5-2004 standard.

There are various building blocks and components employed by digital board 1000 to facilitate its process operations. These include a Joint Test Action Group (JTAG) component 1004, a convergence sub-layer 1006, an IEEE P802.16-REVd/D5-2004 MAC hardware block 1008, an IEEE P802.16-REVd/D5-2004 physical layer transceiver 1010, a TDM component 1012, a memory controller 1014, an IEEE P802.16-REVd/D5-2004 MAC layer 1016, an Ethernet MAC block 1018, synchronous dynamic random access memory (SDRAM) 1020, an Ethernet physical interface 1022, flash memory 1024, and a processor 1026. The digital board architecture further includes a TPM 200 coupled to processor 1026 via a low pin count (LPC) bus 1028. In optional configurations not shown, processor 1026 may be coupled to a memory controller hub or an input/output controller hub, which in turn is coupled to TPM 200 via an LPC bus.

Since digital board processes digital signals, while IEEE P802.16-REVd/D5-2004 transmissions comprise analog signals, means are provided for interfacing between the two signal types. Furthermore, circuitry is needed to produce RF signals having appropriate baseband characteristics. These functions are facilitated by an IF (intermediate frequency)/Baseband transmitter (Tx) signal chip 1029, which includes a digital-to-analog converter (DAC) 1030 and an IF/Baseband receiver (Rx) signal chip 1031 that includes an analog-to-digital converter (ADC) 1032. DAC 1030 chip converts digital signals generated by IEEE P802.16-REVd/D5-2004 physical layer transceiver 1010 into a corresponding analog signal. This signal is fed into an RF up-converter 1036 on RF board 1002, which up-converts the baseband signal frequency to the carrier frequency. The up-converted signal is then amplified via a programmable gain amplifier (PGA) 1038, which outputs an amplified up-converted signal to a transmitter antenna 1040.

Incoming IEEE P802.16-REVd/D5-2004 transmission signals are received at a receiver antenna 1042. The received signal is then amplified (as needed) via a PGA 1043 and provided as an input to an RF down-converter 1044, which down converts the received signal to the selected IF/Baseband frequency. The down-converted signal is then converted to a digital signal via ADC chip 1032.

In general, processor 1026 is representative of various types of processor architectures, including, but not limited to general-purpose processors, network processors, and microcontrollers. In addition, processor 1026 is representative of one or more processing elements. The operations performed by the various digital board layers and components are facilitated by execution of instructions on one or more processing elements, including processor 1026. Generally, the instructions may comprise firmware, software, or a combination of the two. In one embodiment, firmware instructions are stored in flash memory 1024. In one embodiment, software instructions are stored in a storage device, such as a disk drive (not shown), that is connected to processor 1026 via a disk controller (not shown). In one embodiment, all or a portion of the software instructions may be loaded as a carrier wave over a network, which interfaces to digital board 1000 via Ethernet physical interface 1022.

Thus, embodiments of this invention may be used as or to support a firmware and/or software modules executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising:
   generating an attestation identity key (AIK) key pair at a subscriber station, the AIK key pair including a subscriber station AIK private and public key, the AIK key pair being an alias for an endorsement key (EK) that is embedded in a trusted platform module (TPM) of the subscriber station, the AIK key pair being used to sign a subscriber station manifest generated by the TPM;
   sending the subscriber station AIK public key and identification information through a base station of a broadband wireless network to a specific authentication server used for managing access to a broadband wireless network; and
   authenticating the subscriber station to allow the subscriber station to access the broadband wireless network by,
   establishing an unsecured wireless connection with the base station of the broadband wireless network;
   sending subscriber station authentication information to the authentication server via the base station, the subscriber station authentication information comprising the subscriber station manifest having a digital signature signed with the subscriber station AIK private key;
   employing the subscriber station AIK public key to authenticate the subscriber station via the digital signature;
   terminating the established unsecured wireless connection; and
   establishing an authenticated wireless connection with the base station.

2. The method of claim 1, further comprising:
   establishing a wireless connection with the base station;
   sending the subscriber station AIK public key and the subscriber station identification information to the base station; and
   forwarding the subscriber station AIK public key and the subscriber station identification information from the base station to the authentication server.

3. The method of claim 1, further comprising generating the subscriber station AIK key pair with a trusted platform module hosted by the subscriber station.

4. The method of claim 1, wherein the broadband wireless network employs protocols defined by an IEEE (Institute of Electronic and Electrical Engineers) IEEE 802.16-based broadband wireless standard.

5. The method of claim 4, wherein the operations to authenticate the subscriber station are facilitated using a sequence of message exchanges based on a Privacy Key Management protocol defined by the IEEE 802.16-based broadband wireless standard.

6. The method of claim 1, wherein the subscriber station identification information comprises a digital certificate.

7. The method of claim 6, wherein the digital certificate comprises an ITU (International Telecommunications Union)-T X.509 digital certificate.

8. The method of claim 1, further comprising:
   generating an attestation identity key (AIK) key pair at the authentication server station, the AIK key pair including an authentication server AIK private and public key;
   sending the authentication server AIK public key to the subscriber station through the base station; and
   authenticating the authentication server in connection with the request to access the broadband wireless network by,
   sending a manifest having a digital signature signed with the authentication server AIK private key to the subscriber station; and
   employing the authentication server AIK public key to authenticate the authentication server via the digital signature.

9. The method of claim 8, further comprising generating the authentication server AIK key pair with a trusted platform module hosted by an authentication server platform.

10. The method of claim 1, further comprising:
    generating a configuration identifier to identify an authorized configuration of the subscriber station used to access the broadband wireless network;
    wherein sending identification information comprises sending the configuration identifier;
    and wherein authenticating the subscriber station comprises
    determining if a current configuration for the subscriber station platform matches an authorized configuration.

11. The method of claim 10, further comprising:
    securely storing the configuration identifier on the subscriber station platform; and, in response to the request to access the broadband wireless network,
    determining if a current configuration of the subscriber station matches the authorized configuration; and if so,
    enabling the configuration identifier to be retrieved from the subscriber station platform;
    sending the configuration identifier to the authentication server; and
    comparing the configuration identifier sent in response to the request to access the broadband wireless network with the configuration identifier stored at the authentication server to authenticate the subscriber station.

12. The method of claim 10, further comprising:
    measuring a configuration of at least one of a firmware and software configuration to produce an integrity measurement corresponding to an authorized configuration;
    storing the integrity measurement in a trusted platform module platform (TPM) configuration register (PCR) hosted by the subscriber station platform;
    sending the integrity measurement to the authentication server, the integrity measurement comprising an authorized configuration identifier; and
    in response to the request to access the broadband wireless network,
    performing a current measurement of said at least one of a firmware and software configuration on the subscriber station platform to produce a current integrity measurement;
    extending the PCR with the current integrity measurement to produce an extended PCR value;
    sending the extended PCR value to the authentication server; and
    comparing the extended PCR value with the authorized configuration identifier to determine whether to authenticate the subscriber station.

13. The method of claim 12, further comprising:
generating an attestation identity key (AIK) key pair via the subscriber station platform TPM, the AIK key pair including a subscriber station AIK private and public key;
sending the subscriber station AIK public key and subscriber station identification information to the authentication server; and, in response to the request to access the broadband wireless network;
signing the extended PCR value with the subscriber station AIK private key to produce a digital signature; and
sending the signed extended PCR value to the authentication station; and
verifying the digital signature via the subscriber station AIK public key.

14. The method of claim 10, further comprising:
receiving a digital certificate at the subscriber station platform containing a authentication server public key;
storing an authentication server private key at the authentication server;
encrypting the configuration identifier with the authentication server public key; and
decrypting the configuration identifier with the authentication server private key.

15. The method of claim 10, further comprising:
performing at least one integrity measurement that measures one of a firmware or software configuration of the subscriber station platform;
storing each of said at least one integrity measurement in a respective platform configuration register (PCR) of a trusted platform module (TPM) hosted by the subscriber station platform;
sealing the configuration identifier against the TPM using a TPM_Seal command that references the respective PCR(s); and, in response to the request to access the broadband wireless network;
attempting to unseal the configuration identifier using a TPM_Unseal command;
and if the unseal attempt is successful;
extracting the configuration identifier;
sending the configuration identifier that is extracted to the authentication server; and
verifying the configuration identifier that is extracted matches the configuration identifier stored via the authentication server to authenticate the subscriber station platform.

16. The method of claim 15, further comprising:
terminating a connection with a base station to which the subscriber station is connected if the unseal attempt is unsuccessful.

17. The method of claim 15, further comprising:
referencing a current processor locality for the subscriber station platform in the TPM_Seal command,
wherein a locality of the processor when the unseal operation is attempted must match the locality when the configuration identifier was sealed to the TPM to unseal the TPM.

18. A machine-readable storage medium instructions, which if executed perform operations comprising:
commanding a trusted platform module (TPM) hosted by a subscriber station platform to generate an attestation identity key (AIK) key pair, the AIK key pair including a subscriber station AIK private and public key, the AIK key pair being an alias for an endorsement key (BK) that is embedded in the TPM of the subscriber station, the AIK key pair being used to sign a subscriber station manifest generated by the TPM;
sending the subscriber station AIK public key and subscriber station identification to the specific authentication server via a first connection with the authentication server through a base station of a broadband wireless network;
establishing an unsecured second connection with the authentication server, the second connection facilitated by a wireless connection with the base station;
generating a subscriber station manifest;
digitally signing the subscriber station manifest with the subscriber station AIK private key;
sending subscriber station authentication information to the authentication server via the base station, the subscriber station authentication information including the digitally-signed manifest;
terminating the established second unsecured wireless connection; and
establishing an authenticated wireless connection with the base station.

19. The machine-readable storage medium of claim 18, storing further instructions to perform operations including:
establishing a wireless connection with the base station, the wireless connection comprising the first connection with the authentication server; and
sending the subscriber station AIK public key and the subscriber station identification information to the base station via the wireless connection.

20. The machine-readable storage medium of claim 18, wherein the broadband wireless network employs protocols defined by an IEEE (Institute of Electronic and Electrical Engineers) 802.16-based broadband wireless standard, the machine-readable storage medium storing further instructions to perform operations including:
interacting with the base station to authenticate the subscriber station via a sequence of message exchanges based on a Privacy Key Management protocol defined by the IEEE 802.16-based broadband wireless standard,
wherein the digitally-signed manifest is included in an authorization request message sent to the authentication server via the base station.

21. The machine-readable storage medium of claim 18, storing further instructions to perform operations including:
receiving an authentication server AIK public key from the authentication server via one of the first connection or another connection that occurs prior to the second connection;
storing the authentication server AIK public key to be accessible to the subscriber station platform;
receiving a manifest having a digital signature signed with the authentication server AIK private key; and
employing the authentication server AIK public key to authenticate the authentication server via the digital signature.

22. The machine-readable storage medium of claim 18, storing further instructions to perform operations including:
measuring a configuration of at least one of a firmware and software configuration to produce an integrity measurement corresponding to an authorized configuration of the subscriber station platform on which the instructions are executed;
storing the integrity measurement in the TPM configuration register (PCR) hosted by the subscriber station platform;
sending the integrity measurement to the authentication server via the first connection with the authentication server, the integrity measurement comprising an authorized configuration identifier; and in response to a request to access the broadband wireless network via the authenticated wireless connection facilitated by a base station operated by an operator of the broadband wireless network;

performing a current measurement of said at least one of a firmware and software configuration on the subscriber station platform to produce a current integrity measurement;

extending the PCR with the current integrity measurement to produce an extended PCR value; and sending the extended PCR value to the base station.

23. The machine-readable storage medium of claim 22, storing further instructions to perform operations including:

in response to the request to access the broadband wireless network via the authenticated wireless connection, signing the extended PCR value with the subscriber station AIK private key to produce a digital signature; and sending the digitally-signed extended PCR value to the base station.

24. The machine-readable storage medium of claim 22, wherein the broadband wireless network employs protocols defined by an IEEE (Institute of Electronic and Electrical Engineers) 802.16-based broadband wireless standard broadband wireless standard, the machine-readable storage medium storing further instructions to perform operations including:

interacting with the base station to authenticate the subscriber station via a sequence of message exchanges based on a Privacy Key Management protocol defined by the IEEE 802.16-based broadband wireless standard broadband wireless standard, wherein the digitally-signed manifest is included in an authorization request message sent to the authentication server via the base station.

25. The machine-readable storage medium of claim 18, storing further instructions to perform operations including:

generating a configuration identifier to identify an authorized configuration of the subscriber station platform on which the instructions are executed and used to access a broadband wireless network via a base station;

sending the configuration identifier to an authentication server operated by an operator of the broadband wireless network via the first connection;

measuring a configuration of at least one of a firmware and software configuration to produce at least one integrity measurement corresponding to an authorized configuration of the subscriber station platform on which the instructions are executed;

storing each of said at least one integrity measurement in a respective platform configuration register (PCR) of the TPM hosted by the subscriber station platform;

issuing a TPM_Seal command to seal a digest containing the configuration identifier against the TPM, the TPM_Seal command referencing the respective PCR(s); and, in response to the request to access the broadband wireless network via a second connection comprising a wireless connection to the base station;

issuing TPM_Unseal command to unseal the digest; and if the unseal command is successful;

extracting the configuration identifier from the digest; and sending the configuration identifier that is extracted to the base station.

26. The machine-readable storage medium of claim 25, storing further instructions to perform operations including:

in response to the request to access the broadband wireless network via the second connection;

signing a manifest containing the configuration identifier that is extracted with the subscriber station AIK private key to produce a digital signature; and sending the digitally-signed manifest to the base station.

27. The machine-readable storage medium of claim 25, wherein the broadband wireless network employs protocols defined by an IEEE (Institute of Electronic and Electrical Engineers) 802.16-based broadband wireless standard broadband wireless standard, the machine-readable storage medium storing further instructions to perform operations including:

interacting with the base station to authenticate the subscriber station via a sequence of message exchanges based on a Privacy Key Management protocol defined by the IEEE 802.16-based broadband wireless standard broadband wireless standard, wherein the digitally-signed manifest is included in an authorization request message sent to the authentication server via the base station.

28. An apparatus, comprising:

a processor;

a plurality of broadband wireless network components compliant with the IEEE (Institute of Electronic and Electrical Engineers) P802.16-based broadband wireless standard, operatively coupled to the processor, the broadband wireless components to facilitate communications over a IEEE P802.16-based broadband wireless network;

a trusted platform module (TPM), operatively coupled to the processor; and at least one storage device, operatively coupled to the processor and having instructions stored therein, which when executed by the processor perform operations including:

commanding the TPM to generate an attestation identity key (AIK) key pair, the AIK key pair including a subscriber station AIK private and public key corresponding to a subscriber station platform in which the apparatus is installed, the AIK key pair being an alias for an endorsement key (EK) that is embedded in the TPM of the subscriber station, the AIK key pair being used to sign a subscriber station manifest generated by the TPM;

sending the subscriber station AIK public key and subscriber station identification to the specific authentication server via a first connection with the authentication server through a base station of a broadband wireless network;

establishing an unsecured second connection with the authentication server, the second connection facilitated by a wireless connection with the base station;

generating a subscriber station manifest;

digitally signing the subscriber station manifest with the subscriber station AIK private key;

sending subscriber station authentication information to the authentication server via the base station, the subscriber station authentication information including the digitally-signed manifest;

terminating the established second unsecured wireless connection; and establishing an authenticated wireless connection with the base station.

29. The apparatus of claim 28, wherein the processor comprises a network processor.

30. The apparatus of claim 28, wherein said at least one storage device includes a flash memory device, and at least a portion of the instructions comprise firmware instructions.

* * * * *

UNITED STATES PATENT AND TRADEMARK OFFICE
CERTIFICATE OF CORRECTION

| | | |
|---|---|---|
| PATENT NO. | : 7,747,862 B2 | Page 1 of 1 |
| APPLICATION NO. | : 10/878713 | |
| DATED | : June 29, 2010 | |
| INVENTOR(S) | : Ovadia | |

It is certified that error appears in the above-identified patent and that said Letters Patent is hereby corrected as shown below:

In column 21, at line 58 after, -- medium -- insert -- storing --.

In column 21, at line 64 delete, "(BK)" and insert -- (EK) --.

Signed and Sealed this
Fourteenth Day of June, 2011

David J. Kappos
*Director of the United States Patent and Trademark Office*